United States Patent [19]
Pommerening et al.

[11] 3,963,873
[45] June 15, 1976

[54] LOCAL TRANSFER ARRANGEMENT FOR ELECTRONIC PRIVATE AUTOMATIC BRANCH EXCHANGE

[75] Inventors: Uwe A. Pommerening, Webster; Glenn L. Richards, Caledonia, both of N.Y.

[73] Assignee: Stromberg-Carlson Corporation, Rochester, N.Y.

[22] Filed: Mar. 25, 1975

[21] Appl. No.: 561,745

[52] U.S. Cl. .......................................... 179/18 BD
[51] Int. Cl.[2] ........................................ H04M 3/54
[58] Field of Search ...... 179/18 AD, 18 EA, 18 GF, 179/18 ES, 18 AB, 18 FF, 18 AH, 18 AG, 18 BD, 18 BE, 18 C, 27 CA, 99

[56] References Cited
UNITED STATES PATENTS

| | | | |
|---|---|---|---|
| 3,748,396 | 7/1973 | Hestad et al. ................. | 179/18 BD |
| 3,806,661 | 4/1974 | Gueldenpfennig et al. ..... | 179/18 BD |
| 3,859,474 | 1/1975 | Gueldenpfennig et al. ..... | 179/18 BD |

*Primary Examiner*—Thomas A. Robinson
*Attorney, Agent, or Firm*—William F. Porter, Jr.

[57] ABSTRACT

A local transfer arrangement for an electronic private automatic branch exchange having a space divided rectangular solidstate switching matrix is disclosed. The local transfer arrangement is provided with means for sensing a local transfer indication from either a calling station or a called station connected by a local junctor. The transfer indication causes the system to forward the transferring station to a second local junctor and hold the first local junctor. A transferee station is then signaled via the second local junctor of the impending local transfer by the transferring station. Thereafter, an automatic forwarding of the transferee station to the first local junctor is initiated by an on-hook condition of the transferring station to complete the operation. Additional features of the arrangement provide for a return to the original call and release of the connected junctors responsive to an on-hook or hookflash condition of the transferring station. A local three-way conference feature is also provided to establish a connection between the transferred station, transferee station, and transferring stations of the exchange.

6 Claims, 14 Drawing Figures

FIG 1B

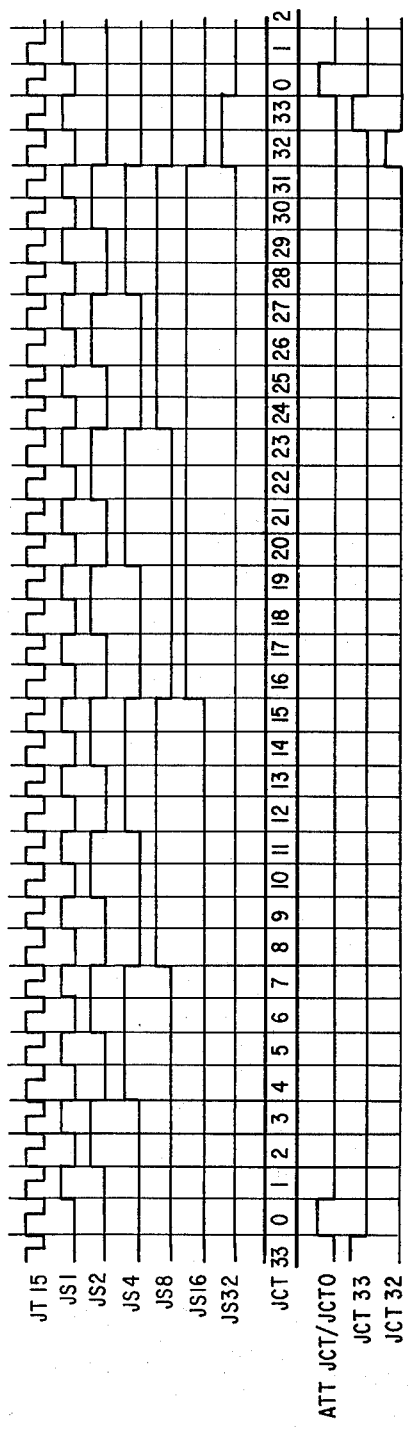
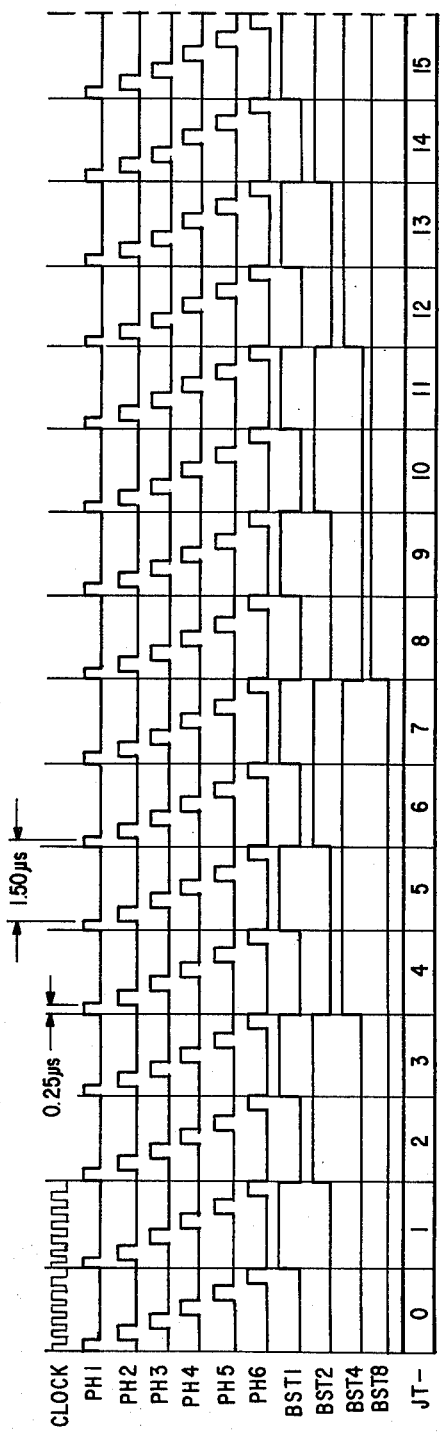
FIG. 2C
FIG. 2A

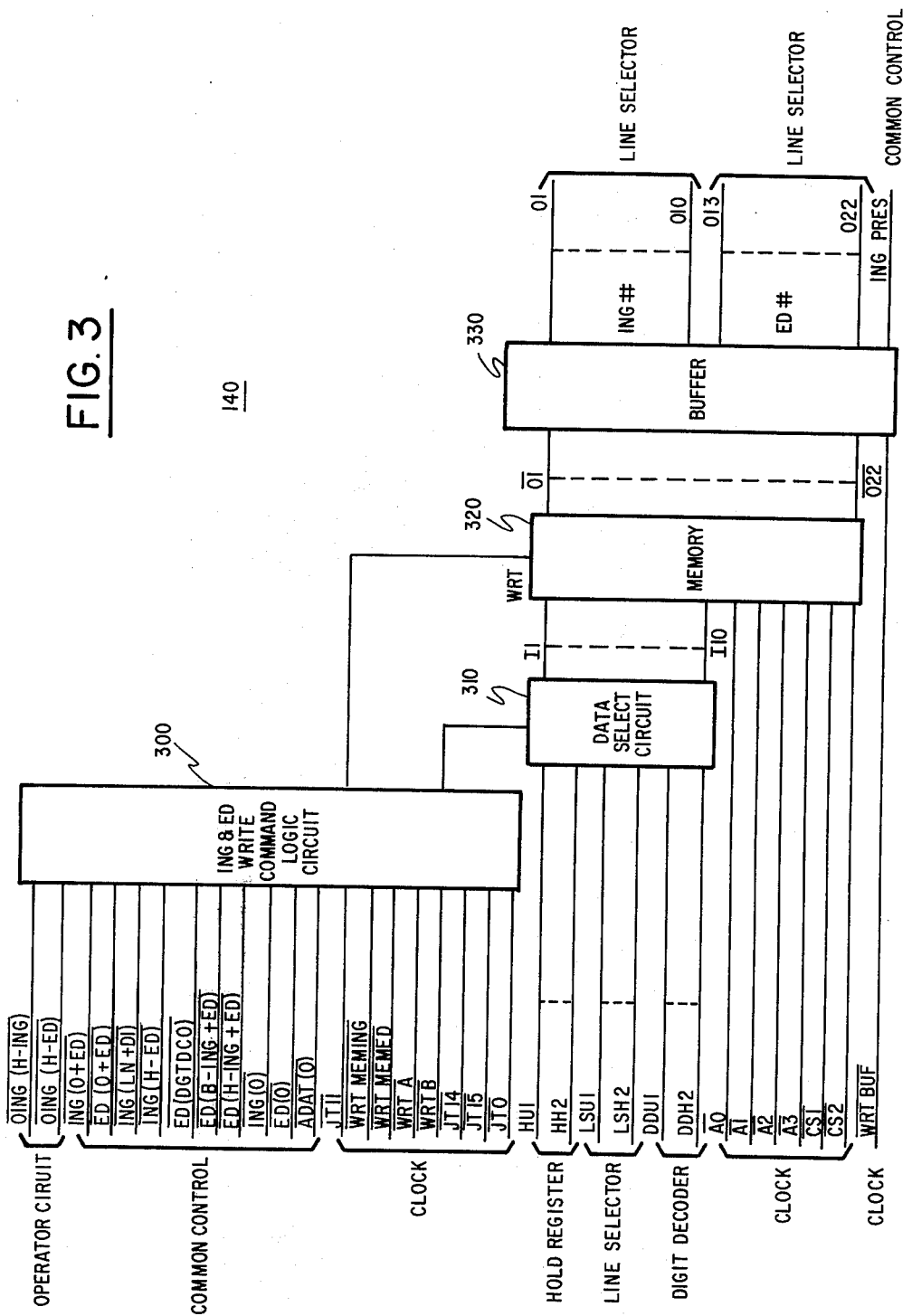

LOCAL TRANSFER ARRANGEMENT FOR ELECTRONIC PRIVATE AUTOMATIC BRANCH EXCHANGE

BACKGROUND OF THE INVENTION

The invention pertains generally to special feature arrangements for electronic private automatic branch exchanges and more particularly to a local transfer arrangement for an EPABX which is built around a space-divided rectangular switching matrix.

Normally, the feature of local transfer is provided by an equipment configuration capable of allowing one local station (hereinafter termed the transferring station) to forward another connected local station (hereinafter termed the transferred station) to a third local station (hereinafter termed the transferee station). The local transfer feature permits the transferred station to be connected to the transferee station without re-dialing by the transferred station.

Typically, the local transfer function is provided as a common feature on many key systems where a manual pushbutton or the like controls circuitry for the local transfer operation. This method requires additional equipment to be added to the system and another signaling devices that must be operated by the subscriber. Further, local transfer between private automatic branch exchange stations not using key systems is usually not available or must be attendant assisted.

Some private automatic branch exchanges which include key system features provide for marking line and junctor appearances on either side of a switching matrix and path finding between appearances by way of a free mark lead. The path through the switching matrix is generally held by energizing a sleeve lead along the free path found. The sleeve lead must remain energized throughout the process of local transfer since if any part of the connection is broken, the held party (transferred party) will be released.

Recently, an electronic private automatic branch exchange which is built around a space divided rectangular solid state switching matrix was developed to provide an exchange which is more dependable in operation and less subject to misoperation due to interference, cross-talk and other problems.

In this exchange one side of the solid state matrix provides line appearances which are connected to line circuits, tone receivers, senders and operator loops. The other coordinate side of the matrix provides junctor appearances for connection to an attendant junctor, local junctor and trunk junctors. The solid state switching matrix is a single stage matrix providing direct connection between line appearances and junctor appearances by the closing of a single crosspoint, and connection between lines within the system is effected simply by the interconnection of a pair of crosspoints associated with the respective lines and a selected junctor, thereby providing a greatly decreased amount of switching for establishing a connection through the matrix.

The matrix in this electronic PABX is employed only for providing an audio path between stations and junctors and is, therefore, not advantageously connectable with many prior art local transfer arrangements using a sleeve lead for path finding.

The electronic private automatic branch exchange providing the above features is more fully described in copending application, entitled, "Electronic Private Automatic Branch Exchange," Ser. No. 431,928, filed on Jan. 9, 1974, in the names of Uwe A. Pommerening and Glenn L. Richards, assigned to the same assignee as the present application, and the disclosure of which is incorporated herein by reference.

The control system for the matrix of the above-referenced exchange is more fully described in a copending application, entitled, "Matrix Control For Electronic Private Automatic Branch Exchange," Ser. No. 431,878, filed on Jan. 9, 1974, in the names of Uwe A. Pommerening and Glenn L. Richards, assigned to the same assignee as the present invention, and the disclosure of which is incorporated herein by reference.

A tone control arrangement for the above referenced exchange is more fully described in a copending application, entitled, "Tone Control For Electronic Private Automatic Branch Exchange," Ser. No. 431,885, filed on Jan. 9, 1974, in the names of Glenn L. Richards and Uwe A. Pommerening, assigned to the same assignee as the present invention, and the disclosure of which is incorporated herein by reference.

SUMMARY OF THE INVENTION

The present invention includes an arrangement to provide the special feature of local transfer in an electronic private automatic branch exchange which is built around a space-divided solid state matrix. The arrangement comprises means for sensing a local transfer indication from a transferring station. The arrangement also includes means, responsive to the local transfer indication, for holding the first local junctor while the transferring station is forwarded to a second local junctor. From the second local junctor, the transferring station signals the transferee station of an impending local transfer and subsequently completes the local transfer operation by going on-hook. The arrangement then provides means to automatically release the second local junctor and establish a local call between the transferred and the transferee station via the first local junctor.

The arrangement provides additional means for re-establishing the original local call by a hookflash signal from the transferring station prior to the transfer operation and means for establishing a local three-way conference. The local three-way conference is established by connecting the transferring station to the transferred station via the first local junctor and to the transferee station by the second local junctor.

The local transfer arrangement is accessed on a time shared basis concurrently with the common control circuits of the private automatic branch exchange and is therefore, instantly available for a local junctor requesting the transfer operation during its control time slot.

Also, substantial amounts of the common circuits of the private automatic branch exchange are used by the arrangement to provide efficiency and the facile integration of the local transfer arrangement into the system. Thus, the exchange is provided with a non-traffic dependent local transfer arrangement without the additional circuitry of a key system.

Accordingly, it is an object of the invention to provide the key system feature of local transfer as a time shared private automatic branch exchange feature by a local transfer arrangement.

It is another object of the invention to provide the local transfer feature in an electronic private automatic branch exchange which is built around a space divided rectangular solid state switching matrix.

It is still another object of the invention to provide a local transfer arrangement capable of establishing a local three-way conference call between the transferred, transferring, and transferee parties.

Other objects, features and advantages of the present invention will become more readily apparent from the following detailed description of a preferred embodiment presented in conjunction with the accompanying drawings, wherein:

BRIEF DESCRIPTION OF THE DRAWINGS

FIGS. 2A, 2B and 2C are waveform diagrams of clock signals used to control the timing of functions within the private automatic branch exchange of FIG. 1;

FIG. 3 is a schematic block diagram of the junctor memory incorporated in the private automatic branch exchange of FIG. 1;

DETAILED DESCRIPTION OF THE PREFERRED EMBODIMENT

Figure 1A:
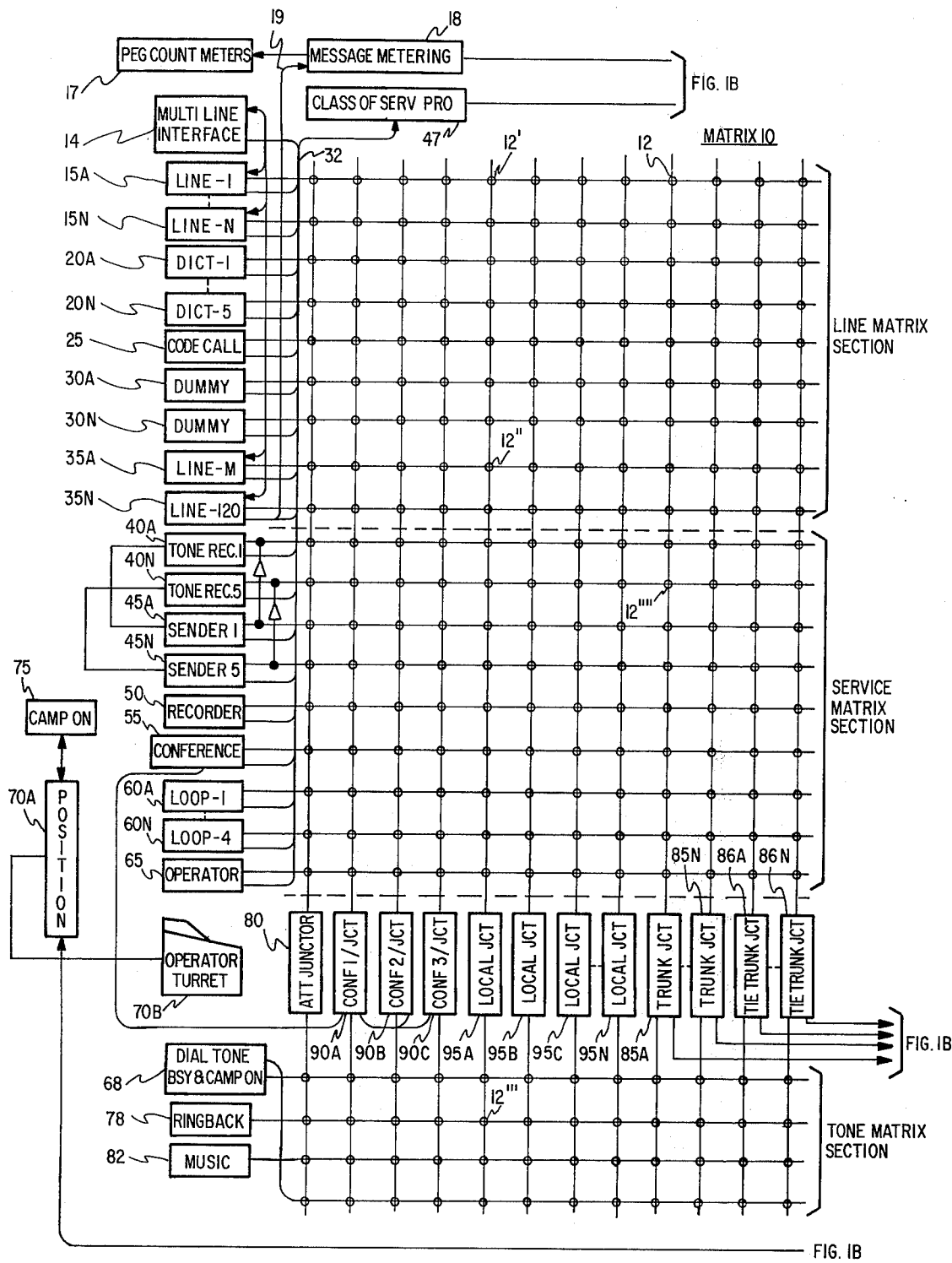
FIGS. 1A and 1B, in combination, form a schematic block diagram of the electronic automatic branch exchange incorporating a local transfer arrangement according to the invention.

The present invention will now be described in conjunction with an electronic private automatic branch exchange which is built around a space divided solid state matrix. The exchange is shown in system block diagrams in FIGS. 1A and 1B and includes a solid state switching matrix 10.

The matrix 10 is a single stage rectangular array of crosspoints divided into three sections, i.e., a line matrix section, a service matrix section and a tone matrix section, as seen in FIG. 1. The matrix serves to establish a low impedance electrical path for passing audio signals between a selected one of a plurality of input leads and a selected one of a plurality of output leads.

Line appearances are provided on the left side of the line matrix section, as seen in FIG. 1, including a plurality of line circuits 15A through 15N and 35A through 35N. Between the line circuits there are provided connections to special lines which take the place of regular lines in the system. These special lines are dictation access circuits 20A through 20N, a code call circuit 25 and a plurality of dummy line tie trunks 30A through 30N.

Line appearances at the service matrix section take the form of a plurality of tone receivers 40A through 40N, a plurality of register senders 45A through 45N, an intercept recorder 50, a conference bridge 55, a plurality of operator loop circuits 60A through 60N and an operator line circuit 65. The number of tone receivers, register senders and operator loop circuits, like the number of line circuits connected to the line appearance inputs of the matrix 10 depend upon the traffic requirements and size of the system. It will be obvious from the following description that an increase or decrease in the number of these circuits is easily accomplished by merely changing the overall size of the matrix 10.

The outputs of the matrix 10 are provided in the form of a plurality of junctor appearances, as seen in FIG. 1. The junctor appearances are associated with an attendant junctor 80, a plurality of conference junctors 90A through 90C, a plurality of local junctors 95A through 95N, a plurality of trunk junctors 85A through 85N and a plurality of tie trunk junctors 86A through 86N. The trunk junctors 85A through 85N are connected to corresponding trunks 89A through 89N, and the tie trunk junctors 86A through 86N are associated with corresponding tie trunks 87A through 87N.

The tone matrix section of the matrix 10 provides inputs on respective lines from a combined dial tone generator and busy-camp on tone generator 68, along with inputs from a ring-back tone generator 78 and music source 82. The outputs of the tone matrix section are connected through the respective junctors to the junctor appearances of the line and service matrix sections of the matrix 10.

The operator complex includes, in addition to the loop circuits 60A through 60N and the operator line circuit 65, an operator position circuit 70A to which is connected an operator turret 70B.

A camp-on circuit 75 providing a special feature in the system is also connected to the operator position circuit 70A. As another special feature of the system, a message metering circuit 18 and one or more peg count meters 17 are associated with the line circuits via a bus 19.

The matrix 10 functions to selectively connect an input from a line to a selected junctor by closing the appropriate crosspoint and to provide an appropriate tone through the selected junctor to the line by closing the appropriate crosspoint in the tone matrix section. Connection from one line to another line is also effected by closing the pair of crosspoints in the line matrix section associated with the respective lines and a common junctor.

The matrix 10 is designed to carry only the audio communication between lines or between a line and a trunk. The signaling associated with the establishment of the communication connection through the matrix 10 is handled outside of the matrix via a common bus 32 through a class-of-service programmer 47 connected to the common control equipment 100.

Figure 1B:
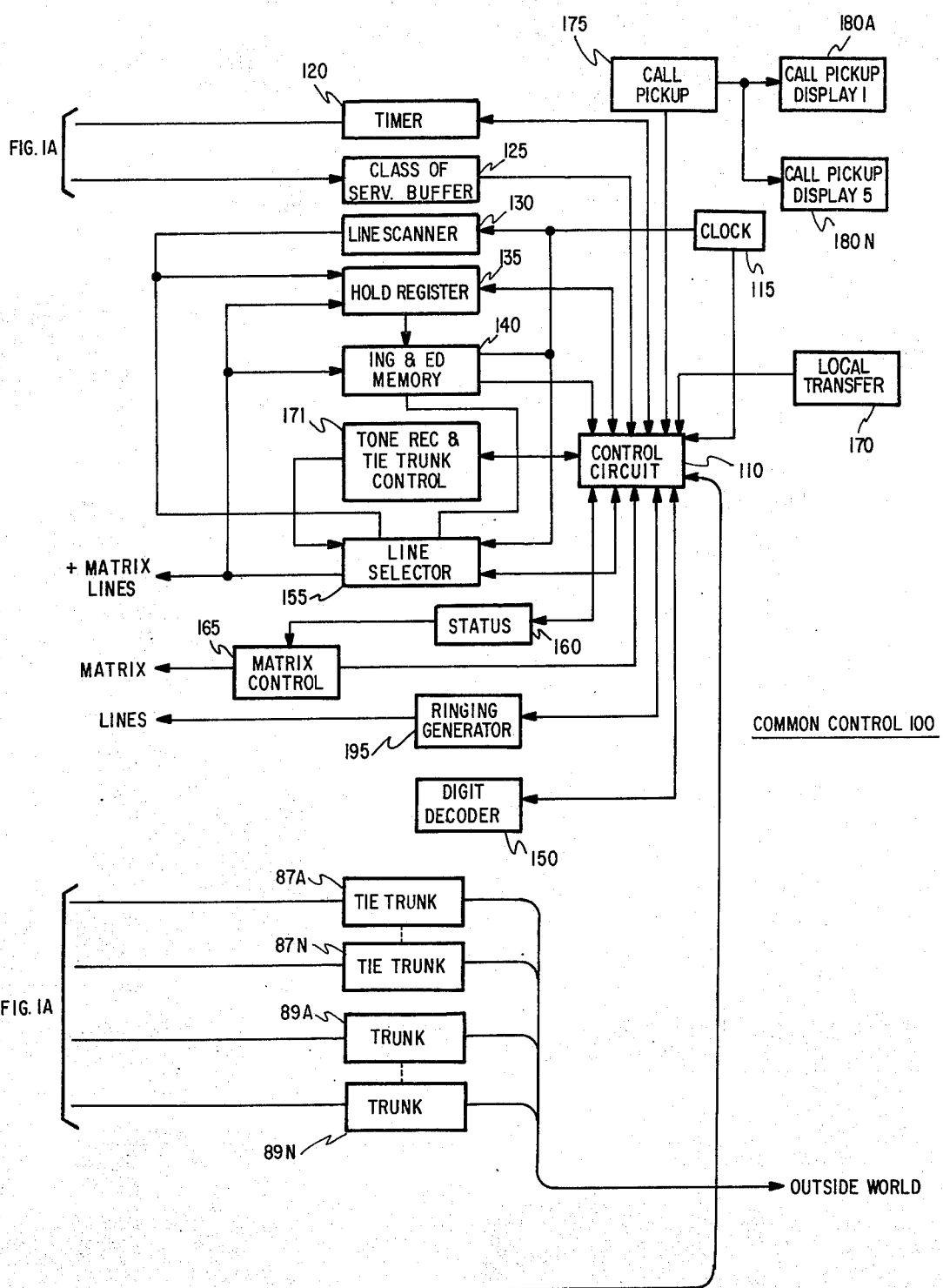

FIG. 1B schematically illustrates the various elements of the common control 100, the heart of which is formed by a plurality of control circuits 110 in the form of a hard-wired programmer. The timing of the various functions which are performed in the system under control of the control circuits 110 is regulated by the various timing signals produced by a clock 115, which is directly connected to the line scanner 130, which serves to generate the line scanning signals, and is connected through the control circuits 110 to the various other elements in the common control 100 to provide a time base for the various functions thereof.

A timer 120 is also provided in the common control 100 to analyze the information concerning the line conditions and other information from the junctor and perform memory timing functions within the system. For example, on-hook and off-hook timing, time-outs, flash detection and other conventional timing functions are performed by the timer 120. In this regard, the timer 120 operates with the control circuits 110 to perform whatever timing functions are necessary within the system.

A class-of-service buffer 125 forms an interface between the class-of-service programmer 47 and the logic circuitry of the common control 100. Thus, the various line conditions which are derived through the class-of-service programmer 47 each time a line is addressed will be passed to the control circuits 110 through the class-of-service buffer 125.

The line scanner 130 is driven from the clock 115 and serves to scan each of the lines in turn continuously to detect requests for service. In this regard, the lines are addressed by the line scanner in conjunction with the scanning of the junctors, a line being addressed from the line scanner at the end of each complete scan of all of the junctors, as will be described in greater detail in connection with line selection and matrix control operation. Each time a line is addressed by the line scanner 130, the calling bridge relay information within the line is forwarded via the common bus 32 and the class-of-service programmer 47 to the control circuit 110 in the common control 100 via the class-of-service buffer 125. In this way, the status of the line, i.e., whether or not it is requesting service of the system, is monitored during the continuous scanning of the lines by the line scanner 130.

A hold register 135 is provided as a temporary memory which is used for various systems operations in conjunction with information stored in conjunction with the various junctor circuits. As will be described in greater detail, the system stores the identity of the lines associated with any junctor during the entire duration of a call in the system, so that during the establishment of the communication connection between parties and in providing various functions requested by the parties during the call, it is necessary at various times to temporarily store information as functions are being performed within the system by the common control 100. The hold register 135 provides the temporary storage capability in the system.

The system includes an ING and ED memory 140 which forms the basic junctor memory portion for storing the calling and called numbers identifying the lines associated with each of the junctors. The memory 140 includes storage positions assigned to each of the junctors, which storage positions are continuously scanned by clock signals derived from the clock 115. Thus, if a junctor is associated with one or more lines, the scanning of the portion of memory 140 assigned to that junctor will produce the calling and/or called numbers of these lines which are stored therein. In this way, the identity of the crosspoints in the matrix 10 associated with the line or lines involved with the junctor can be identified.

A line selector 155 receives line designations from the line scanner 130 and from the junctor memory 140, and in response to the clock signals from the clock 115 selectively addresses crosspoints in the matrix 10 and selected lines at the proper times. As already indicated in connection with the description of the solid state crosspoint matrix 10, addressing alone of the crosspoint will open the crosspoint, while addressing in combination with a positive request for actuation of the crosspoint will close the crosspoint. Whether or not the crosspoint is to be opened or closed is determined by the status of the call based upon the progress of the connection as determined by the control circuits 110 from the information derived from the lines via the class-of-service programmer 47 and class-of-service buffer 125. The system control progresses in states, with the individual states being monitored by the status circuit 160, which stores the state in which any particular call is in and advances under control of the control circuits 110 as the call progresses from one state to the next in a particular program. Thus, the information concerning the desired condition of the crosspoint, i.e., whether it is to be open or closed, is derived from the status circuit 160. If the crosspoint which is addressed from the line selector 155 is to be closed for a particular call, a matrix control 165 will receive information from the status circuit 160 to this effect and generate a positive request signal for closing of the crosspoints. If the crosspoints are not to be closed, the matrix control 165 will produce no output as the crosspoints are addressed, thereby effecting an automatic opening of the crosspoints.

A ringing generator 195 of any known form is provided for application of ringing current to the lines under control of the control circuits 110. While the ringing generator is in itself a conventional circuit, the application of ringing to the line in the system of the present invention is somewhat different than known systems in view of the multiplex addressing of the various lines by the common control. Thus, the output of the ringing generator 195 may be connected simultaneously to all lines since the lines are addressed in turn during the scanning of the junctors associated therewith. In this way, the system requires only a single ringing generator, thereby materially simplifying the system in reducing the costs thereof.

The digit decoder 150 performs analysis of the incoming digits and makes decisions concerning these received digits. For example, the digits received by the digit decoder 150 are analyzed for line-to-line calls, line-to-trunk calls, toll restrictions and other information. The information provided by the digit decoder 150 then serves to initiate various control functions within the control circuits 110 as the various states of the call progress.

As a special feature, the system provides a local transfer circuit 170 which effects transfer between stations, as may be required.

A further special feature of the present invention is embodied in a call pickup arrangement including a call pickup circuit 175 and a plurality of call pickup displays 180A through 180N. In accordance with this special feature, a party may respond to a call to another party identified on the call pickup display.

The function of the various elements of the system of the present invention will become clearer from a general description of various basic functions of the system.

BASIC SYSTEM OPERATION

The lines are continuously scanned from the line scanner 130 via the line selector 155 in the common control 100, so that a line circuit requesting service will ultimately be addressed permitting the state of the calling bridge relay in the line circuit to be passed on through the class-of-service programmer 47 along with the class-of-service information concerning that line circuit to the common control 100.

Assuming that the line circuit 15A has gone off-hook and is requesting service, this line will ultimately be addressed by the line selector 155 when the line scanner 130 reaches this line in its scan of all of the lines. At the same time, the line selector 155 will also address all of the crosspoints of the matrix 110 associated with that line circuit. In this case, all of the crosspoints associated with the line circuit 15A along the first horizontal of the matrix including the crosspoint 12' will be addressed. If, as a result of some misoperation, one or more of these crosspoints has been inadvertently closed, the addressing of the crosspoints at this time will automatically open the crosspoints in the absence of the positive control from the matrix control 165 indicating that one or more of these crosspoints should be closed. Since the line 15A has just requested service, none of the crosspoints should be closed and therefore the status circuit 160 will provide no indication to the matrix control 165 that any of the crosspoints involved should be closed. In view of the fast scanning times provided within the system for scanning the lines and junctors, it can be seen that a misoperation of a crosspoint will be immediately corrected so that no effect upon any communication connection through the matrix will result, nor will such crosspoint misoperation be noticeable to either party except for a click as the crosspoint is opened or closed to correct the state thereof. Further details concerning the unique operation of the matrix under control of the line scanner 130, line selector 155 and matrix control 165 are disclosed in our copending application Ser. No. 431,878, filed on Jan. 9, 1974, and assigned to the same assignee as the present application.

When the control circuit 110 receives an indication through the class-of-service buffer 125 that the line circuit 15A has requested service, the control circuits 110, which include a junctor allotter and is more fully described in copending application Ser. No. 448,288, filed on May 5, 1974, and assigned to the same assignee as the present invention, will assign a free junctor to the line circuit and request that the calling line number of the line circuit 15A be stored in the junctor memory 140 in the time position assigned to the selected junctor. The control circuits 110 will also address the status circuit 160 to record in the memory thereof that the call associated with the selected junctor is in the first state of operation. Assuming that the junctor allotter in the control circuits 110 selects the local junctor 95A, the calling line number of the line circuit 15A will be stored in the memory position of the junctor memory 140 permanently assigned to the local junctor 95A, and each time the junctors are scanned, the line number of the calling line 15A will be forwarded to the line selector 155 so that the line 15A can be addressed at this time and the crosspoint associated both with the line 15A and the junctor 95N, i.e., the crosspoint 12' can be addressed. The status circuit 160 indicates to the matrix control 165 that the call is in a state wherein the crosspoint 12' should be closed, and therefore the matrix control 165 will forward a positive request for closing the crosspoint 12' at the time the crosspoint is addressed. As a result, the line circuit 15A will be connected through the matrix 10 to the local junctor 95N.

At the same time that the crosspoint 12' is addressed and closed to enable connection between the line circuit 15A and the local junctor 95A, the matrix control 165 under control of the status circuit 160 addresses the crosspoints of the tone matrix section of the matrix 10 associated with the dial tone generator 68 so that the crosspoint 12''' will be closed connecting the dial tone generator 68 through the local junctor 95A to the line circuit 15A. The line circuit may then commence to dial the number of the party to which it desires connection.

The control circuits 110 in the common control 100 will advance the status circuit 160 of the particular junctor 95A to state 2 if the calling line circuit has rotary dial equipment or to state 3 if the calling line circuit has TONE-DIAL (multi-frequency dialing) equipment, as determined from the class-of-service information for that line circuit received from the class-of-service programmer 47. Each time the junctor 95A is scanned, the number of the calling line circuit 15A will be provided by the junctor memory 140 to the line selector 155 which will address the line permitting the calling bridge relay state to be monitored via the bus 32 and class-of-service programmer 47 in the common control 100. The digit decoder 150 will accumulate the calling bridge relay states and provide to the control circuits 110 the digit information which will be stored in the memory portion of the junctor memory 140 assigned to the junctor. Eventually, the junctor memory 140 will have stored in the portion thereof assigned to the junctor 95A both the calling and called line numbers.

When it is determined by the timer 120, more fully described in copending application Ser. No. 542,947, filed on Jan. 22, 1975, entitled, "Timer Apparatus" and assigned to the same assignee as the present application, that the calling line 15A has completed dialing, the control circuits 110 will advance the status circuit 160 to record state 4 in the position of the memory thereof assigned to the junctor 95A. State 4 relates to busy test, and more fully described in copending application Ser. No. 543,042, filed on Jan. 22, 1975, entitled, "Busy Test Arrangement For EPABX" and assigned to the same assignee as the present application, of the busy called line circuit. If the called line circuit is found to be busy, the tone matrix section of the matrix 10 is once again addressed from the matrix control 165 to connect busy tone from the generator 68 through the local junctor 95A to the calling line circuit 15A. On the other hand, if the called line circuit is free, the control circuits 110 will advance the status recorded in status circuit 160 to state 5 for application of ringing from the ringing generator 195 to the called line circuit and to address the tone matrix section of the matrix 10 to connect the ring back tone generator 78 through the local junctor 95A to the calling line circuit 15A. The control over the tone matrix section of the matrix 10 to provide for connection of dial tone, busy tone, ring back tone and music to the lines through selected junctors is described in greater detail in our copending application Ser. No. 431,885, filed on Jan. 9, 1974, and assigned to the same assignee as the present application.

The matrix control 165, upon receiving the calling and called line numbers from the junctor memory 140 as the junctor 95A is scanned, will address the crosspoint 12' and also the crosspoint associated with the called line, for example, crosspoint 12" associated with the line 35A. Thus, when the called party answers in response to the applied ringing, he will be connected via crosspoints 12' and 12" in the matrix 10 to the calling party, and the respective line circuits 35A annd 15A will receive ground to maintain crosspoint bias, as described in connection with FIG. 3, from the local junctor 95A during the duration of the call. At this time, the status circuit 160 is advanced by the control circuits 110 to status 7, indicating to the system that a local call is in progress.

Where the lines are equipped with TONE-DIAL (multi-frequency) equipment, this class-of-service for the line circuit is indicated to the common control by the class-of-service programmer 47. In this regard, the class-of-service programmer 47 typically includes a panel having selected class-of-service plugs so that the features of the system may be allocated on a real time line basis and the information with respect thereto may be provided to the common control 100. Thus, in addition to providing a path for the calling bridge relay information from the lines, the class-of-service programmer 47 also submits at this time class-of-service data concerning the particular line for use by the common control 100.

When a call is in state 3 indicating dialing from TONE-DIAL (multi-frequency) equipment, the common control 100 effects connection via the matrix between the calling line and an available one of the tone receivers 40A through 40N. The tone receiver converts the TONE-DIAL signal into the corresponding binary number, which is received by the common control 100 and placed into the ING or ED memory 140.

Since the operator loop circuits 60A through 60N are merely provided as line appearances at the input of the matrix 10, the functions associated with the operator positions are greatly simplified. Because of the fast switching capability of the crosspoints in the matrix 10, the split functions normally associated with incoming connections to the operator may be performed with the matrix crosspoints. Thus, special trunk circuits having separate operator access with split tip and ring pairs, as normally required in conventional systems, are not required in the system of the present invention.

In addition, since the split functions are performed in the present system within the matrix 10 by selective operation of the crosspoints, the operator loop circuits and position circuits which normally control such functions can be greatly simplified. Since the operator loop circuits are effectively line circuits in the present system, switching a trunk to a line or to an operator is the same function for the system. This makes it also possible to greatly simplify the loop circuits.

Since the attendant junctor 80 controls the crosspoints for the required split functions in connections to the operator complex, hardware for special trunks, like information trunks, is not required in the system. The junctor performs the information trunk duties without requiring extra equipment, thereby simplifying the system. Also, special access trunks for the operator, which are usually quite complex are not required. The junctor circuit once again takes care of the duties normally provided in this regard. In addition, due to the elimination of information trunk hardware, tandem operation for operator extended calls to trunks between information trunks and the central office trunks is not required.

The operator is accessed by the line via the local junctor which acts as the information trunk, and when the operator extends the call to a central office trunk, the local junctor is dropped and the central office trunk junctor takes over the duties.

In outgoing trunk calls, it is necessary for the system to switch from a local junctor to a trunk junctor. In this regard, the line circuit is initially connected to a local junctor 90A—90C upon detection of the request for service in the manner described above by closing the crosspoint in the matrix 10 common to the line circuit and a selected available local junctor. In the foregoing example, by closing local junctor 95A. An addressing of the tone matrix section provides connection of the dial tone generator 68 through crosspoint 12''' and the local junctor 95A to the line circuit 15A. When dialing commences, the crosspoint 12''' is released, disconnecting dial tone from the line circuit and the dialing impulses are received in the common control 100 via the class-of-service programmer 47. The digit decoder 150 for outgoing trunk calls will recognize the first digit as a request for access to a trunk circuit and the control circuits 110 will indicate the need to connect to a trunk junctor. The junctor allotter, more fully described in copending application Ser. No. 448,288, filed May 5, 1974, entitled, "Junctor Allotter" and assigned to the same assignee as the present application, in the control circuits 110 will select an available trunk junctor, for example, the junctor 85A connected to the trunk 89N.

As can be seen, with the arrangement of the present invention, many different functions can be performed during the time in which a junctor is being scanned through selective control of various crosspoints within the matrix 10 under control of the common control 100 during designated time slots of the junctor scan period, as will be described in greater detail in connection with the system timing.

SYSTEM TIMING

Figure 2B:
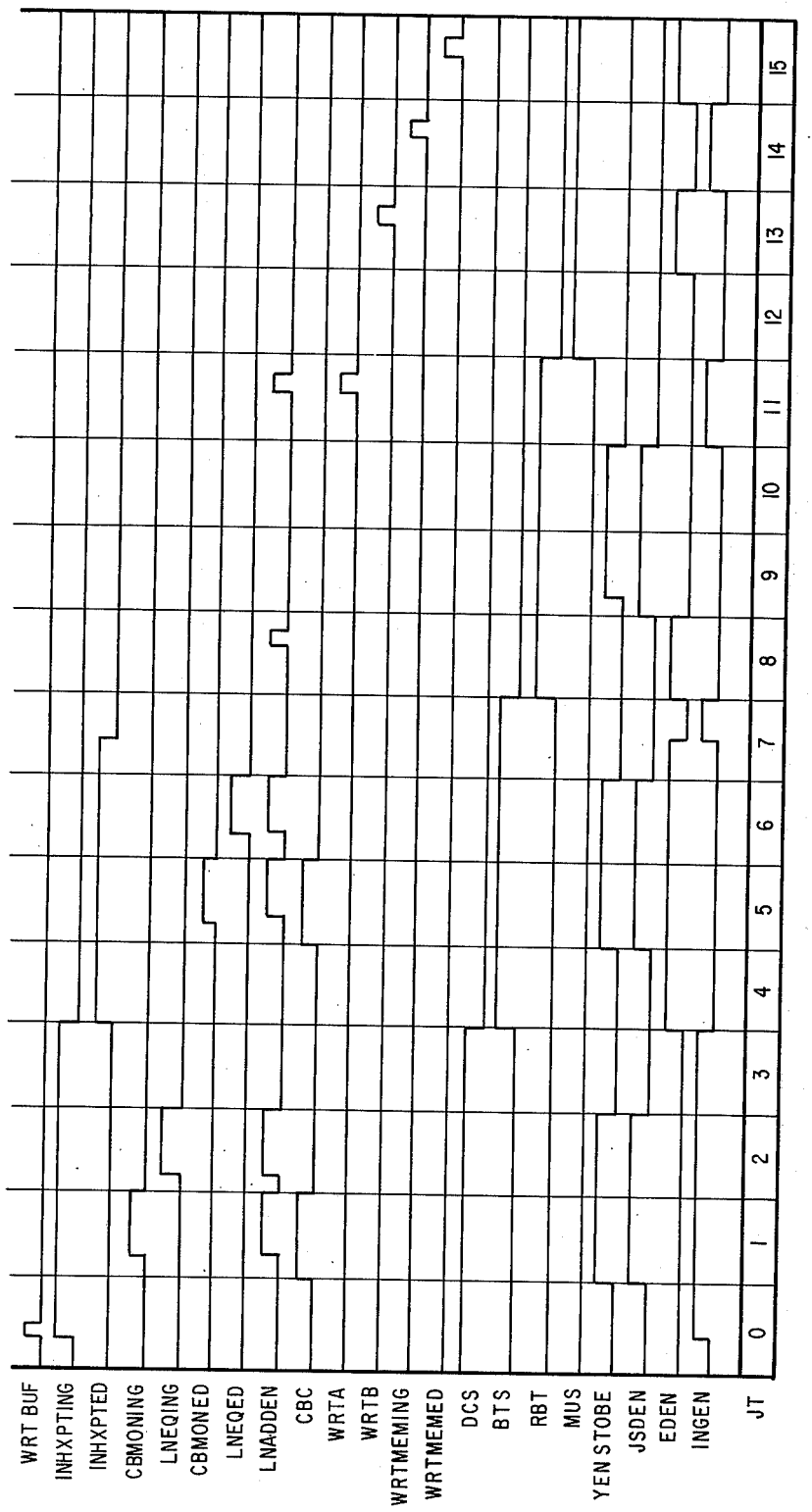

The system timing is controlled by the clock 115 in the common control 100 on the basis of various clock signals such as presented in FIGS. 2A through 2C. Typically, the clock 115 includes a 4 MHz crystal oscillator connected to a divider chain and various decoders to produce the required clock signals for controlling the various elements of the system.

As already indicated in the general system description, the junctor memory 140 includes a storage position for each of the junctors in the system and this memory is recirculated so that the information stored in each junctor position is scanned successively during a recurring time frame. In the embodiment disclosed, thirty-two junctors are connected to the output of the matrix 10, so that the junctor memory 140 will include thirty-two junctor time positions. In addition, the junctor memory 140 also includes time positions 32 and 33 which represent time periods during which a scanning of the lines is effected. Thus, after all junctors have been scanned, the line number designated by the line scanner 130 will be addressed during the time positions 32 and 33 to determine whether there is a request for service in connection with that line. At the end of each 32 time positions, the line scanner 130 will be advanced to the next line, with the result that the lines are scanned one at a time at the end of each complete scan of the junctors.

Each junctor time position is subdivided into junctor time slots during which the various functions required in connection with the call associated with the particular junctor are performed under control of the control circuit 110. During one or more of the time slots of each junctor time position, one or more functions may be performed by various elements of the common control as required by the state of the particular call which is under the control of the control circuits.

Figure 4:
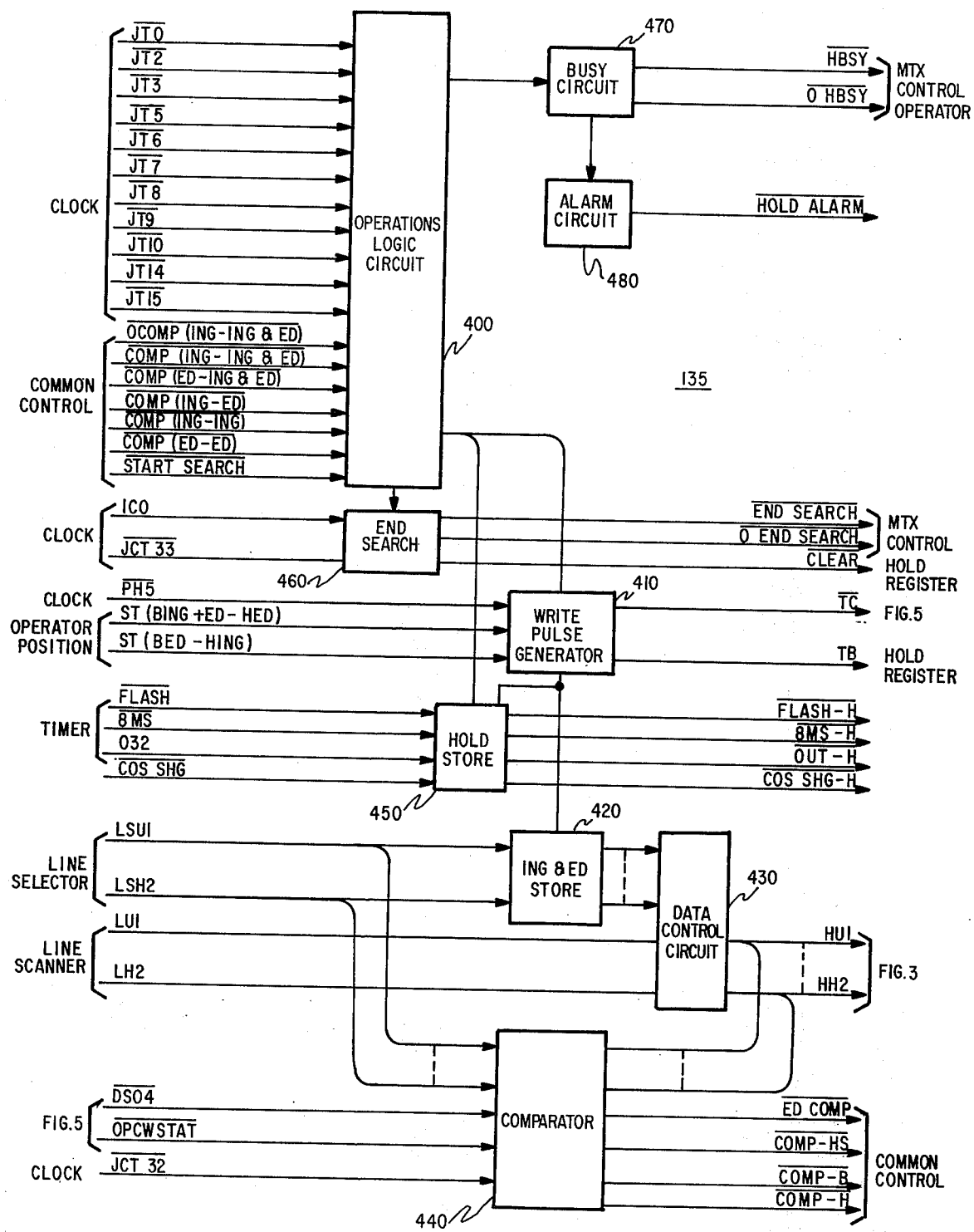
FIG. 4 is a schematic block diagram of the hold register incorporated in the private automatic branch exchange of FIG. 1.

FIG. 4A illustrates the output of a 4 MHz crystal oscillator (defining a portion of the clock 115) from which a plurality of phase signals PH1 through PH6 are derived by a clock phase generator producing a division by six of the basic frequency. The output of the clock phase generator is connected to a bit time slot counter which effects a division by sixteen to produce the binary bit time slot signals BTS1 through BTS8. A decoding of the four bit binary time slot signals produces the sixteen junctor time slot signals JT0 through JT15.

Further decoding of the binary bit time slot signals BTS1 through BTS8 also produces various timing signals which are utilized throughout the system. Those timing signals which will be utilized in the various common control circuits to be described below are illustrated in FIG. 4B in relation to the sixteen junctor time slot signals JT0 through JT15. The function of these timing signals will be described in connection with the description of the detailed operation of the various common control elements.

FIG. 4C illustrates the waveforms which are derived from the junctor scanner portion of the clock 115. A further division by 34 produces the junctor scan signals JS1 through JS32. A decoding of these junctor scan signals then produces the junctor signals JCT0 through JCT33. Additional decoding produces the signal ATT JCT which represents the junctor 0 position, as well as the junctor 32 and junctor 33 signals, JCT32 and JCT33.

THE STATUS CIRCUIT

Figure 5:
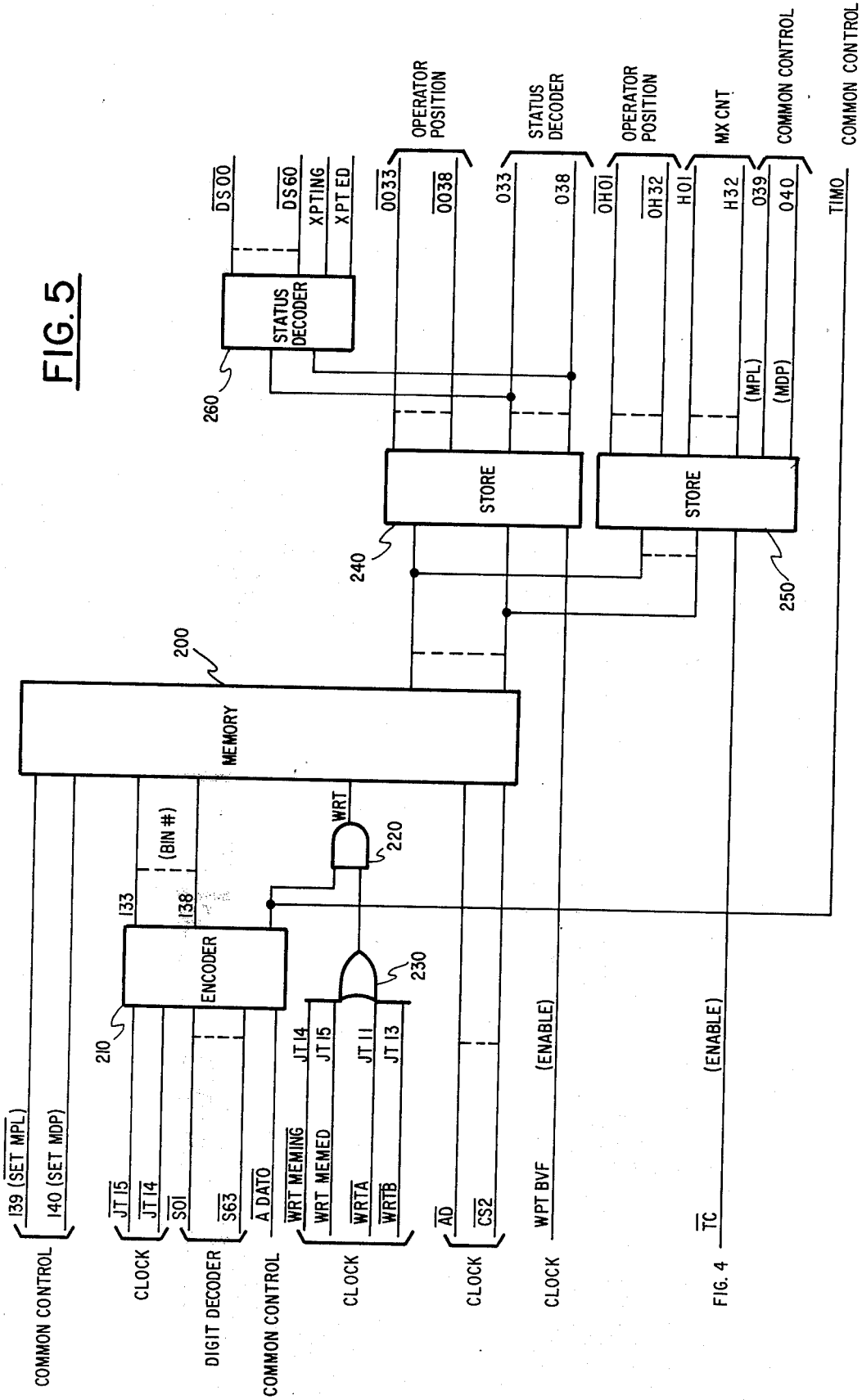
FIG. 5 is a schematic block diagram of the status circuit incorporated in the private automatic branch exchange of FIG. 1.

The status circuit 160 (see FIG. 5) basically forms a memory including a storage position for each of the junctors to store the state of the call associated with each of the junctors. As already indicated in the general system description, the common control 100 steps progressively through various states during which various operations are performed under control of the control circuits 110 to perform the functions required by the system. To determine what functions need to be performed during each junctor scan, the control circuits 110 determine from the status circuit 160 the state of the call associated with that junctor. As the functions associated with each state are completed, the control circuits 110 advance the status circuit 160 to the next state for the particular junctor involved so that a continuous record of the state of the call associated with each junctor is maintained within the status circuit.

In the status circuit, the memory 200 includes thirty-four junctor positions for the junctors JCT0 through JCT31 as well as the junctor time JCT32 and JCT33. The status of the call associated with each junctor is stored in the junctor times of the memory 200 in binary form, and therefore, an encoder 210 is provided to receive from the control circuits 110 the status signals S01 through S63 and provide the binary equivalents thereof on output lines I33 through I38 to the memory 200. Certain of the status signals S01 through S63 are time shared at the input to the encoder 210 under control of the clock signals JT15 and JT14 from the clock 115. A further input to the encoder 210 from the control circuits 110 is the signal A DAT 0 indicating that all data is to be zeroed, i.e., the status stored in connection with a given junctor is to be 0, for example, when a call has been terminated. The status indications are applied from the encoder 210 to the memory 200 during various time slots by controlling the gate 220 from the output of gate 230. The clock signals WRT MEM ING, WRT MEM ED, WRTA and WRTB generated during the junctor time slots JT14, JT15, JT11 and JT13, respectively, are applied through the gate 230 to enable gate 220 to apply the write signal WRT to the memory 200 permitting the status data from the encoder 210 to be written into the junctor period of the memory. The junctor periods are continuously scanned by the clock signals A0 through CS2 derived from the memory address generator controlled from the clock by the junctor signals JS1 through JS32.

In addition to the binary outputs I33 through I38 from the encoder, the memory 200 also receives direct codes of states I39 and I40 from the control circuits 110. The binary status code is read out of the memory 200 into a pair of buffer stores 240 and 250 under control of the enable signals WRT BUF and TC from the clock and hold register, respectively. The buffer store 240 provides the binary outputs 0033 through 0038 to the operator complex, and the signals 033 through 038 to the control circuits 110 and the matrix control 165. The signals 033 through 038 are also applied to a status decoder 260 which provides a binary-to-decimal conversion of the signals into status signals DS00 through DS60, which signals are then applied to various elements of the common control to permit various functions to take place during each designated state.

The buffer store 250 is provided for use with the hold register as a hold-over memory portion for hold register searches. The binary status signals 01101 through 01132 are applied to the operator complex, while the signals H01 through H32 are applied to the matrix control. The signal 038 and 040, which are direct codes of status, are applied to the control circuits 110.

A time zero signal TIM0 is derived from the encoder 210 to indicate to the timer each time a state changes in connection with a given junctor so that the timing functions performed by the timer may be reset to zero.

JUNCTOR MEMORY

The junctor memory 140 (see FIG. 3) includes an ING and ED write command logic circuit 300 which receives various command signals from the control circuits 110 along with junctor time slot signals from the clock and in turn controls the storage and read out of data into and out of a memory 320. The logic circuit 300 receives various command signals for storage of calling and called line numbers in designated locations of each junctor memory portion, which logic signals serve to control a data select circuit 310 receiving line numbers from the hold register 135 on binary inputs HU1 through HH2, from the line selector 155 on binary inputs LSU1 through LSH2, and from the digit decoder 150 on binary inputs DDU1 through DDH2. In accordance with the commands applied to the logic circuit 300, the line numbers from the hold register 135, line selector 155, and digit decoder 150 are gated to the memory 320 on leads 11 through 110 and stored in the memory 320 upon generation of the write command signal WRT from the logic circuit 300.

The commands received from the operator and the control circuits 110 relate to the storing of the called and calling numbers in the proper locations of each junctor portion of the memory. The command $\overline{OING}$ (H-ING) indicates that the calling number from the hold register 135 is to be stored in the ING number location of the junctor portion of the memory 320. Similarly, the command $\overline{OING}$ (H-ED) indicates that the called number from the hold register 135 is to be stored in the ING location associated with the attendant junctor. The command $\overline{ING}$ (O+ED) indicates placing the ED number from the operator in the ING register. The command ED (O+ED) indicates a request to place the ED number from the operator in the called portion of the memory. The command $\overline{ING}$ (LN+D1) indicates that the line number from the buffer is to be placed in the calling portion of the memory 320. The command $\overline{ING}$ (H−ED) indicates that the called number from the hold register 135 is to be placed in the calling portion of the memory 320. The command $\overline{ED}$ (DDT DCD) indicates that the number from the digit decoder 155 is to be placed in the called portion of the memory 320. The command $\overline{ED}$ (B−ING + ED) indicates that the calling and called line numbers from the buffer 330 are to be inserted in the called portion of the memory. The command $\overline{ED}$(H−ING +ED) indicates a request that the calling and called numbers from the hold register 135 are to be placed in the called portion of the memory 140. The command $\overline{ING}$ (0) indicates that the number in the calling portion of the memory 140 is to be zeroed. The command $\overline{ED(0)}$ indicates that the number in the called portion of the memory 140 is to be zeroed. The command $\overline{ADAT\ (0)}$ indicates that all data is to be zeroed.

The signals from the clock 115 represent the various junctor time slots during which the various commands are to be executed. The clock also provides the binary signals A0 through A3, CS1 and CS2 which represent the memory addresses of the junctor portion corresponding to the junctor times JCT0 through JCT32. These junctor signals control the circulation of the data within the memory 320 so that in combination with the junctor time slots applied from the clock to the logic circuit 300, the data will be inserted into the proper junctor portion of the memory 320 during the proper time.

The output of the memory 320 is provided on leads $\overline{01}$ through $\overline{022}$ to a buffer store 330, which provides binary outputs 01 through 010 representing the calling number and binary outputs 013 through 022 representing the called number to the line selector 155. A further output ING PRES to the control circuits 110 indicates that the calling number is present and the output O RING PRES to the operator complex indicates that the calling number is present in the memory portion assigned to the attendant junctor.

As can be seen, the junctor memory basically provides for a memory storage position for each junctor in the system including a junctor position 32 for receiving the line number from the line scanner which is to be addressed for purposes of determining whether a request for service is present. In each memory portion associated with a particular junctor, the calling and called numbers will be stored depending upon the state of the call so that the system may determine each time a junctor is addressed which line circuits, if any, are involved in a call under the control of that particular junctor.

THE HOLD REGISTER

The hold register 135 (see FIG. 4) serves as a temporary memory for calling and called line numbers and other data generated within the common control 100 for use in controlling the functions required in establishing and maintaining a communication connection in the system. The hold register 135 also performs various comparison functions between line numbers, for example, in conjunction with busy searches, line scanning and other functions where a particular calling or called line number is to be compared with the calling and called line number stored in the junctor memory 140.

The functions of the hold register are initiated upon receipt of a comparison request signal or a start search signal from the operator or control circuits 110 in the common control 100. The comparison requests signals and the start search signal are applied to an operations logic circuit 400 along with junctor time slot signals JT0 through JT15 from the clock 115. The comparison request commands include the command $\overline{OCOMP}$ (ING-ING and ED) indicating a request for comparison of the ING number from the attendant's junctor with all ING and ED numbers stored in the junctor memory. The command $\overline{COMP}$ (ING-ING and ED) indicates a request for a comparison of an ING number with all ING and ED numbers of the junctors other than the attendant junctor 80. The command $\overline{COMP}$ (ED-ING and ED) indicates a request for comparison of a called number with all calling and called numbers stored in the junctor memory. The command $\overline{COMP}$ (ING-ED) indicates a request for comparison of a calling number to all called numbers. The command $\overline{COMP}$ (ING-ING) indicates a request for comparing a calling number to all calling numbers stored in the junctor memory. The command $\overline{COMP}$ (ED-ED) indicates a request to compare a called number with all called numbers stored in the junctor memory.

The various comparison requests are acted upon during various junctor time slots by the operations logic circuit and result in enabling of a write pulse generator 410, which in turn enables a hold store 450 and an ING and ED store 420. The hold store 450 receives various data relating to flashes, time-outs, whether the call is an incoming or outgoing call, a designation of the station hunting group, etc., for use by various elements of the common control 100 during the course of the following operations.

The ING and ED store 420 in the hold register 135 stores the calling and/or the called line number associated with a particular junctor as received from the line selector on binary inputs LSU1 through LSH2. For example, if the hold register is requesting a comparison of a called number with all of the calling and called numbers stored in the junctor memory during the time junctor 10 is being scanned, the called number stored in the junctor memory position assigned to junctor 10 will be transferred from the line selector on leads LSU1 through LSH2 to the ING and ED store 420. The numbers stored in the ING and ED store 420 is then applied through the data control circuit 430 to one side of a comparator 440. During the subsequent scanning of the other junctors, the line selector will apply all calling and called line numbers stored in connection with these junctors on binary input lines LSU1 through LSH2 to the other side of the comparator 440. A comparison of the calling numbers stored in the store 420 with all of the calling and called numbers stored in the junctor memory is then effected by the comparator 440. Such a comparison, for example, would form part of the busy search where the system attempts to determine whether a called line is busy by scanning all of the junctor positions in the junctor memory to determine whether the line circuit has its number stored in connection with any other junctor. In this case, the status decoder forming part of the status circuit 160 would provide a signal $\overline{DS04}$ to the comparator 440 enabling the comparison of the numbers stored in and ING and ED store 420 with all numbers received from the line selector 155.

Other comparisons which are performed within the hold register relate to the scanning of the lines by the line scanner 130. At the end of each junctor 32 time position, the line scanner is advanced to the next line and will provide on binary input leads LU1 through LH2 in the hold register the line number which is to be scanned. This line number is applied to the data control circuit 430 which in turn applies it to one side of the comparator 440. During the subsequent scan of the information stored in the junctor memory in connection with the junctors, the comparator 440 will determine whether a comparison exists between the number designated by the line scanner and any number which may be stored in the junctor memory. For example, if a line goes off-hook it might be necessary for the system to determine whether an attempt is at that time being made to complete a call to that line circuit. Since the line scanner steps from one line to the next without knowledge of whether or not a line is already involved in a call, it is necessary for the system to determine before recognizing an off-hook condition from the line as a request for service to determine whether that off-hook condition is a result of a call already established by the system.

The comparator provides various outputs which may be required by the control cirucits in the common control 100 for various functions. The output $\overline{ED\text{-}COMP}$ indicates that only a comparison of the called number has been detected. The outputs $\overline{COMP\text{-}HS}$ and $\overline{COMP\text{-}H}$ indicates a general comparison detected. The output $\overline{COMP\text{-}B}$ indicates that a comparison of a line with its own number has been detected.

The data control circuit 430 merely serves to multiplex the data which is to be applied to the comparator so as to avoid interference between comparisons associated with data stored in the ING and ED store 420 and comparisons involving the number supplied from the line scanner. The data provided from the data control circuit 430 to the comparator 440 is also supplied to the junctor memory on binary output lines HU1 through HH2.

The write pulse generator 410 is also responsive to control signals from the operator and a signal PH5 from the clock to effect certain shifting of data as required by the system. For example, the signal ST (B ING-+ED−H ED) is a request to store the calling and called numbers from the buffer in the junctor memory in the called portion of the ING and ED store of the hold register. The signal ST (B ED-H ING) indicates a request to store the called number from the buffer in the junctor memory in the calling portion of the ING and ED store 420 of the hold register. Such transfers of information from one junctor to the other are necessary for various operations and require a holding of this information between junctor scan times so that the transfer from one junctor position to another junctor position in the junctor memory can be effected. This is accomplished in the ING and ED store 420 under control of the write pulse generator 410. The outputs TB and TC provide indications of the transfer operation and trunk consultation, respectively.

The hold register 135 also includes an end search circuit 460 connected to the operations logic circuit 400 and receiving the control signal IC0 and the clock signal JCT33. The end search circuit 460 merely indicates when a complete scan of all the junctors has been completed. For example, if a search is conducted in the hold register in connection with information stored in junctor 10 position, it is necessary to compare this information with that stored in the junctor positions 11 through 31 and 0 through 9. When the scan once again reaches junctor 10, the end search circuit 460 indicates to the system that the search has been completed. The end search signal $\overline{END\ SEARCH}$ and $\overline{0\ END\ SEARCH}$ are generated along with a $\overline{CLEAR}$ signal to effect control of various elements in the common control 100 at the end of the search.

The hold register 135 also includes a busy circuit 470 which is enabled whenever a comparison request or start search signal is applied to the operations logic circuit 400. The hold register performs one function at a time and is automatically made busy whenever a request for a comparison or search is received. When the hold register is busy, the signals $\overline{HBSY}$ and $\overline{0\ HBSY}$ are applied to the matrix control and operator complex, respectively. Since the hold register should not be busy for more than the time needed for one complete scan of all of the junctors, an alarm circuit 480 is provided in association with the busy circuit 470 which times the busy condition recorded by the busy circuit 470 for two complete scans of all of the junctors. If the busy circuit does not indicate the hold register to be free at the end of two complete scans of all of the junctors, an alarm signal $\overline{HOLD\ ALARM}$ is generated from the alarm circuit 480.

LOCAL TRANSFER

Figure 6:
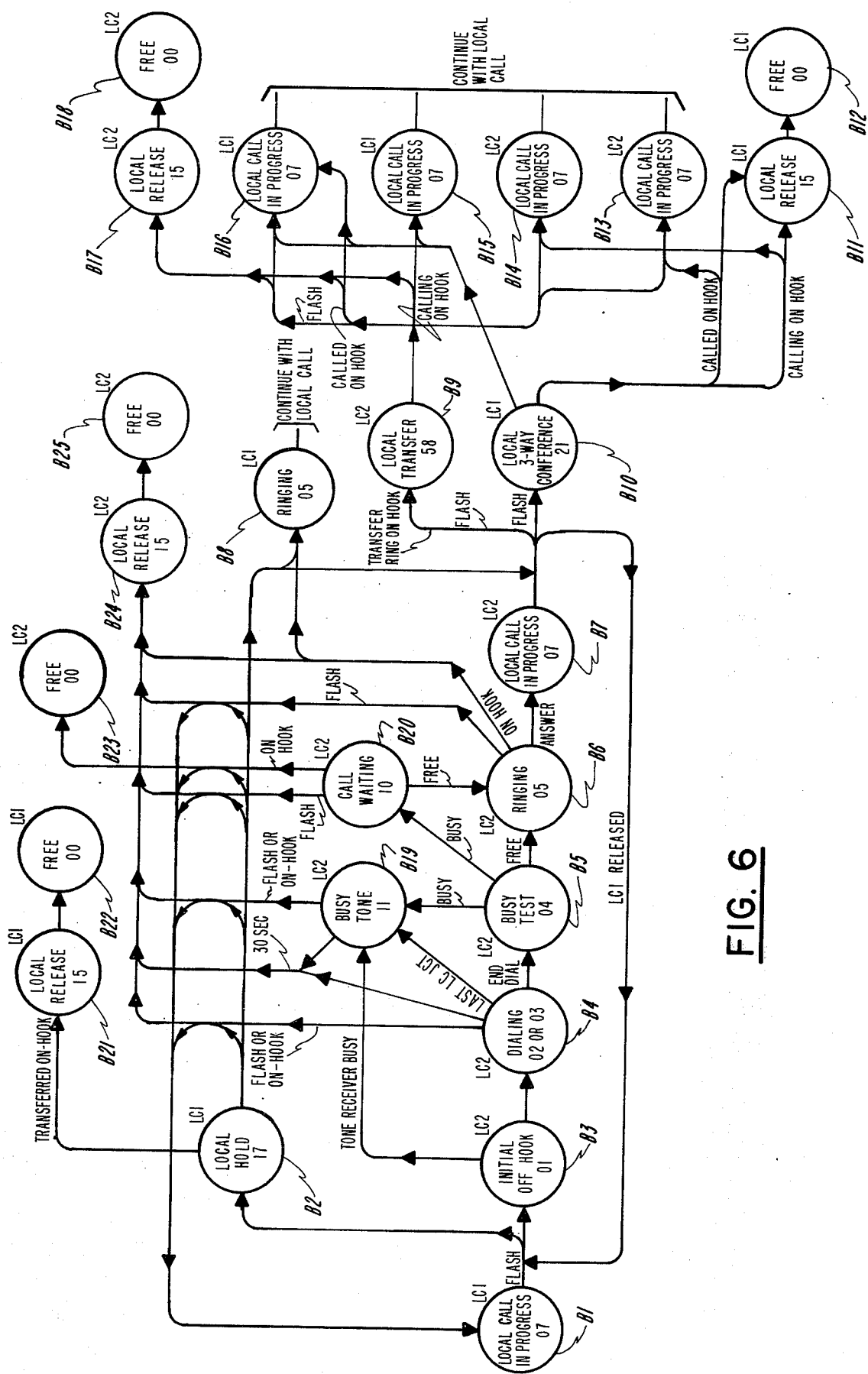
FIG. 6 is a detailed functional status diagram showing the sequential progressions of events carried out for a local transfer operation in accordance with the present invention.

The local transfer arrangement and its interface with the system programs of the private automatic branch exchange will now be more fully described with particular reference to FIGS. 6, 7, and 8.

The functions the EPABX performs when proceeding through the local transfer operation and the different states of status may be described by reference to the flow chart illustrated in FIG. 6.

This flow chart illustrates the system programmed from status to status with each block (or circle) representing the immediate status of a particular junctor. Since two local junctors are used in the local transfer procedure, they will be differentiated by indications to a first local junctor LC1 and a second local junctor LC2 at the corners of each of the status block B1-B25.

The local transfer begins with a local junctor LC1 and a local call in progress status 7 as shown in block B1. The local junctor memory has a 7 stored therein along with the identities of the calling and called parties, and is arranged to proceed to the local transfer operation upon the command of either party. The command which begins the transfer function is a hookflash signal which transfers the local junctor LC1, originally connecting the two parties together, into a local hold status 17 (block B2). The transferring party (either calling or called) which initiated the transfer by a hook flash is forwarded to a second local junctor LC2 and that party becomes the calling party (block B3). At this time an initial off-hook status of 1 is placed in the local junctor LC2 status memory (block B3).

The transferring party then receives dial tone via the local junctor LC2 from the tone matrix and may dial either by dial pulsing, status 2, or multifrequency keying, status 3, (block B4). When the system has received an end dialing signal, the called number (transferee station) is identified and a busy test status 4 (block B5) determines whether the called line is busy or free. If the called line (transferee station) is free, the system progresses to the ringing status 5 (block B6) and produces a ringing tone to the called party from the ringing generator 195 via the control circuit 110 and provides ringback through the tone matrix to the calling party. To complete the call transfer the transferring party now goes on-hook during ringing status 5 (block B6) and the local transfer arrangement forwards the transferee station from the local junctor LC2 to the local junctor LC1 (block B8).

A local release status 15 (block B24) is produced for the local junctor LC2 which returns to the free status 0 (block B25). The local junctor LC1 continues to ring the transferee party (block B8), and has the identity of the called party (transferee) stored in the called portion of the junctor memory. From the ringing status 5 (block B8), the ringing continues until the transferee station answers and completes the call transfer. The system continues with a regular local call in progress and the transfer arrangement is ready to service additional calls.

A number of other sequences may be followed by the PABX system in progressing through the local transfer function. For example, if the transferred party in the local hold status 17 (block B2) returns on-hook before the ringing status 5 (block B8), the local junctor LC1 is released by a local release status 15 (block B21) and returns to the free status 00 (block B22).

Other sequences provide for sending busy tone to the calling party if the tone receiver is busy when the initial off-hook status 1 is produced (block B3) or when the line tested by the busy test status 4 (block B5), is not idle. When these conditions occur, the busy tone status 11 is placed in the local junctor LC2 status memory (block B19). The busy tone status 11 (block B19) is also produced by the last local junctor which is busy in the dialing status, 2 or 3, (block B4). If, however, during busy test status 4, the system is equipped for call waiting, the call waiting status 10 (block B20) is provided instead of busy tone and the system initiates a re-try until the tested line is free and then proceeds from block B20 to the ringing status 5 (block B6).

If during either dialing status, 2 or 3, (block B4) or during busy tone status 11 (block B19) the calling party (transferring party) does not take action within 30 seconds, the local junctor LC2 is released by local release status 15 (block B24) and freed (block B25).

At any time before the ringing status 5 (block B8) a second hookflash by the transferring party returns the caller to the original local call in progress status 7 of the junctor LC1 (block B1) and causes the local release status 15 (block B24) for the local junctor LC2. These paths are shown for the dialing status, 2 or 3, the busy tone status 11 (block B19) and the call waiting status 10 (block B20). Further, an on-hook signal from the transferring station at this time produces the similar results except that an on-hook signal from the call waiting status 10 (block B20) produces an immediate release of the local junctor LC2 (block B23) and the beforementioned on-hook in the ringing status 5 (block B6) produces the transfer function described above.

The PABX system is also capable of producing local consultation and/or local three-way conference features, as will be more fully described below. If, instead of going on-hook when ringing status 5 (block B6) produces the signaling to the called party, the calling party (transferring station) remains off-hook, a local call in progress status 7 (block B7) results when the transferee party answers. At this time the local junctor LC1 is still in a local hold status 17 (block B2) and is connected to the transferred party. The transferee part and the transferring party may now consult in the local call in progress status 7 (block B7) without the transferred party. If, during the consultation, the transferred party returns on-hook releasing local junctor LC1, then the transferring party will be returned to local call in progress status 7 (block B1).

The transferring party may establish a three-way conference connection following the consultation connection by hookflashing a second time which produces a local three-way conference status 21 (block B10) and a local transfer status 58 (block B9). Both junctors are used since the junctor memory contains only an ING and ED position for call identities and three parties are in conference. The transferring party and the transferee party are connected (block B10) by the local junctor LC1 and the transferring party and the transferred party are connected by local junctor LC2 (block B9). Thus, the transferred and transferee stations are connected by the common crosspoints of the transferring station line.

Another path is provided for progressing the system to the local transfer status 58 (block B9) and the local three-way conference (block B10). When the transferring party goes on-hook, instead of hookflashing, from a local call in progress status 7 (block B7), the transferred station is connected to the transferee station after momentarily progressing through the local transfer status 58 (block B9) and the local three-way conference status 21 (block B10). The identity of the junctor that produces the actual connection depends on which junctor time slot the system is presently addressing. For example, if the system is currently addressing local junctor LC1 then the transferee station will be forwarded to local junctor LC2 and local call in progress status 7 (block B14) and the local junctor LC1 is freed via local release status 15 (block B11). However, if the system addresses the local junctor LC2 before the local junctor LC1, then the transferred station is forwarded to the local junctor LC2 and local call in progress status 7 (block B15) and the local junctor LC2 is freed via local release status 15 (block B17). The identical sequences are followed if the transferring station hookflashes into the local transfer status 58 (block B9) and the local three-way conference status 21 (block B10) and then returns on-hook.

While the parties are in the three-way conference provided by the two local junctors, LC1, LC2, a third hookflash by the transferring party releases the local junctor LC2 via local release status 15 (block B17) and a free status 0 (block B18) and the local junctor LC1 continues with the local call in progress status 7 (block B16). Thus, the transferee party may be eliminated from the connection by a third hookflash.

Alternatively, if the transferred station (called station in local junctor LC1) goes on hook during the three-way conference then the transferring station is forwarded to local junctor LC2 and a local call in progress status 7 (block B13); thereafter, the local junctor LC1 is released via local release status 15 (block B11). A local call in progress status 7 (block B16) in local junctor LC1 results if the transferee station (called station in local junctor LC2) goes on-hook. This action releases local junctor LC2 via blocks B17 and B18 and the original call is restored.

These foregoing functional descriptions complete the flow diagram of the local transfer operations. Some of the operations shown in the flow diagram of FIG. 6 are common to the private automatic branch exchange in normal operation. For example, the transfer feature uses the common circuitry of the exchange to establish the local call in progress from local junctor LC2 and the initial off-hook status 1. These operations of the common circuitry for a local call were described in blocks B3, B4, B5, B6, B7, B19 and B20. In addition, the local release of junctors illustrated in blocks B11, B12, B17, B18, B21, B22, B23, B24 and B25 are provided as a common feature of the exchange.

The actual local transfer operations and their interface with the common functions of the exchange will now be more fully explained.

Figure 7A:
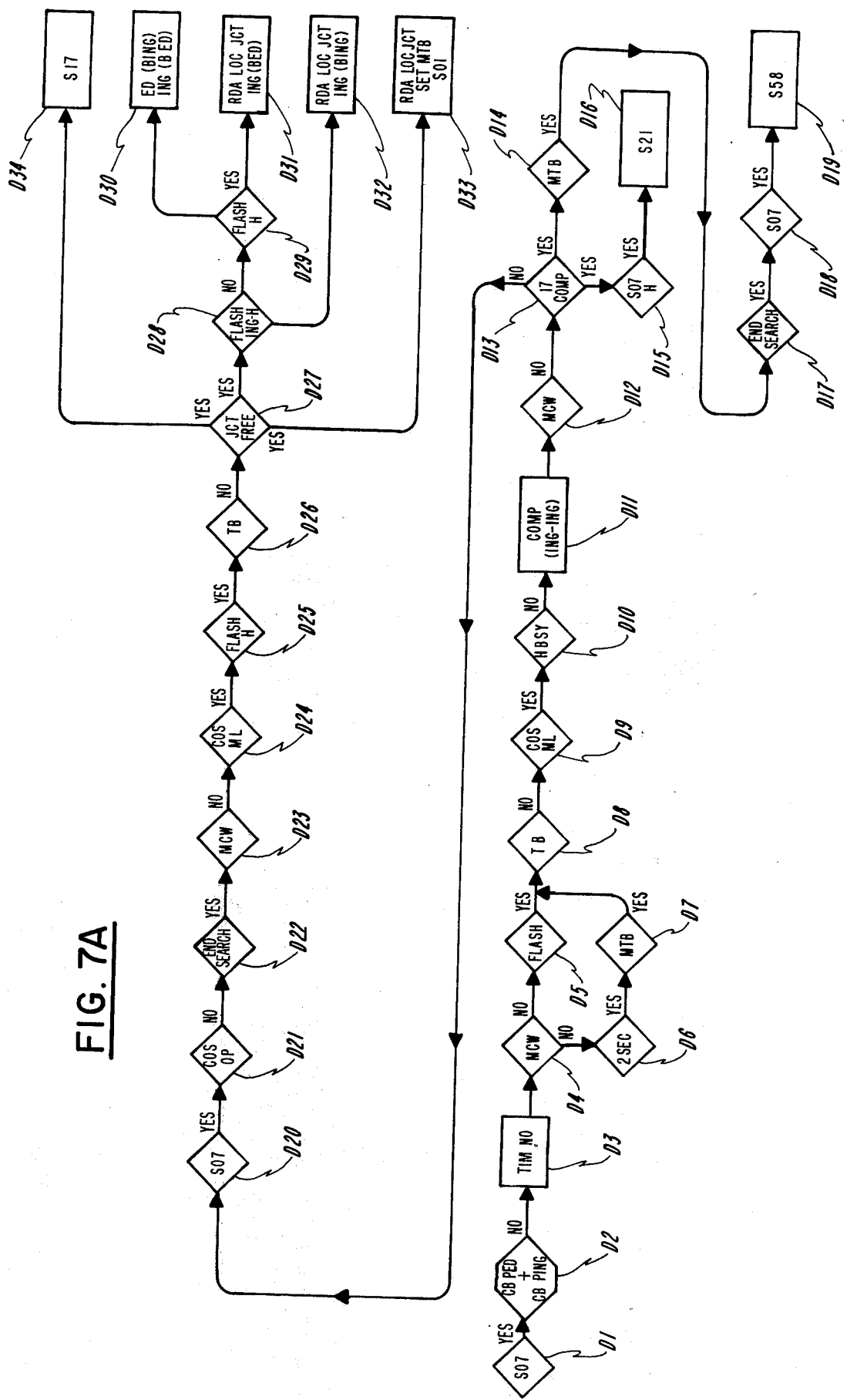
FIGS. 7A, 7B and 7C are detailed functional diagrams showing the operational decisions carried out for the local transfer status progression illustrated in FIG. 6.

FIGS. 7A, B and C are functional descriptions of the status changes shown in FIG. 6 for the local junctors LC1 and LC2. Each functional diagram shows a number of logical decisions or commands which must be accomplished by the system for the local transfer circuit to produce the next desired status in the flow chart shown in FIG. 6.

In FIG. 7A the functional diagram shows the progression of the system from status 7 in decision D1 to the status 21 in D16, to status 58 in D19, to status 17 in D34, or to status 1 in D33. The decisional blocks then call for a progression of the system from a local call in progress status 7 and a local junctor LC1 in block B1 of FIG. 6 to the local hold status 17 in local junctor LC1 (block B2) and an initial off-hook status 1 in local junctor LC2 (block B3)

In addition the system may proceed from the local call in progress status 7 (block B7) to a local transfer status 58 in local junctor LC2 (block B9) or to a local three-way conference status 21 in a local junctor LC1 (block B10). Therefore, there are two paths which the system may take from the status 7 shown in D1 depending on whether the system initially determines if the called or the calling party in the local junctor addressed has gone onhook. If either of the off-hook signals (CB PED, CB PING) for the calling and called parties are not present (no in D2) the system starts the timer to indicate the duration of the on-hook signal in D3 after first checking the call waiting bit MCW in D4.

If the call waiting bit is not set, then the system, by means of the timer, determines whether the on-hook signal is a flash, (yes in D5) or a two second on-hook signal (yes in D6). The local transfer bit MTB is also checked in D7 and the system determines that this is a local transfer call by an affirmative response to the decision in D7 and by a negative response to the question is the trunk transfer bit set in D8. When the system is equipped for trunk transfer, decision D8 provides the necessary blocking of the path for correct operation. If the system addresses a junctor in status 7 (block B1) the path proceeds through decisions D5 and D8 indicating a flash has occurred and the seizure of another junctor is desired for the local transfer operation. The system progresses through either of the paths decisions D5, D6 and decision D7, if the call is in status 7 (block B7) and the three-way conference status 21 (block B10) and local transfer status 58 (block B9), respectively, is desired.

The system then checks whether the calling line has the class-of-service indication, COSML, allowing a local transfer to take place in D9 and, if the answer is yes, a comparison is started by the hold register if it is found to be idle in D10.

The signal COMP (ING-ING) requests the hold register to compare all of the calling numbers located in each junctor memory with the calling number of the junctor (in status 7) now addressed by the system. After a comparison is found the call waiting bit again is checked in D12 and, if it is still not present, a check D13 is made whether a status 17 was found in the status portion of the memory for a junctor having the same stored calling number as that searched for. If a status 17 is not found, the local transfer has not yet been requested and the system proceeds to initialize the local transfer function from D13. If the junctor were in a status 7 (block B7) the local junctor LC1 would be in a held condition and the system finds the comparison.

At this time, the system has established that it is in block B1 in FIG. 6 (local call in progress — status 7). The comparison is not made since the calling number in local junctor memory LC 1 associated with LC1 is not contained in any other junctor. The system next begins the local transfer function by checking again to see if the status is 7 (block D20 in FIG. 7), whether the calling line has a class-of-service for the operator (block D21), and whether the comparison search has ended (block D22). Affirmative response to the checks in blocks D20 and D22 and a negative response to the check in block D21 indicate that the system may now begin the initializing of the second local junctor for the local transfer operation. The system checks again whether the calling line has a local transfer class-of-service, COSML (block D24) and whether the hold register search was initiated by a hookflash (block D25). If the answers are in the affirmative, and there is no trunk transfer bit set (block D26), the transfer arrangement recognizes a second junctor should be seized for a local transfer operation.

At this time the system attempts to allot a local junctor for the local transfer operation and, if a local junctor is free (block D27), the arrangement proceeds to put the original local junctor LC1 into a local hold status 17 (block D34), and random accesses the second local junctor LC2 to set a local transfer bit MTB and to initialize the status of the second local junctor to an initial off-hook status of 1 (block D33). Simultaneously therewith, the system checks if the calling line performed the hookflash that began the hold register search (block D28) and, if so, the identity of the number contained in the ING portion of the buffer is stored in the ING portion of the memory associated with second local junctor LC2. However, if the flash came from the called number (yes in block D29), the second local junctor has the information in the ED portion of the buffer stored in its ING memory (block D31) and the first local junctor has the calling and called numbers in its associated memory reversed (block D30). Thus, a second local junctor calling party is always initialized with the transferring station — i.e., the station that has hookflashed always becomes the calling party in the memory associated with the second local junctor and the transferred party always becomes the called party in the memory associated with the first local junctor. The switch of identities in the local junctors' memories is only necessitated if the transferring party is the called party (as determined by no decision in block D28).

Figure 8A:
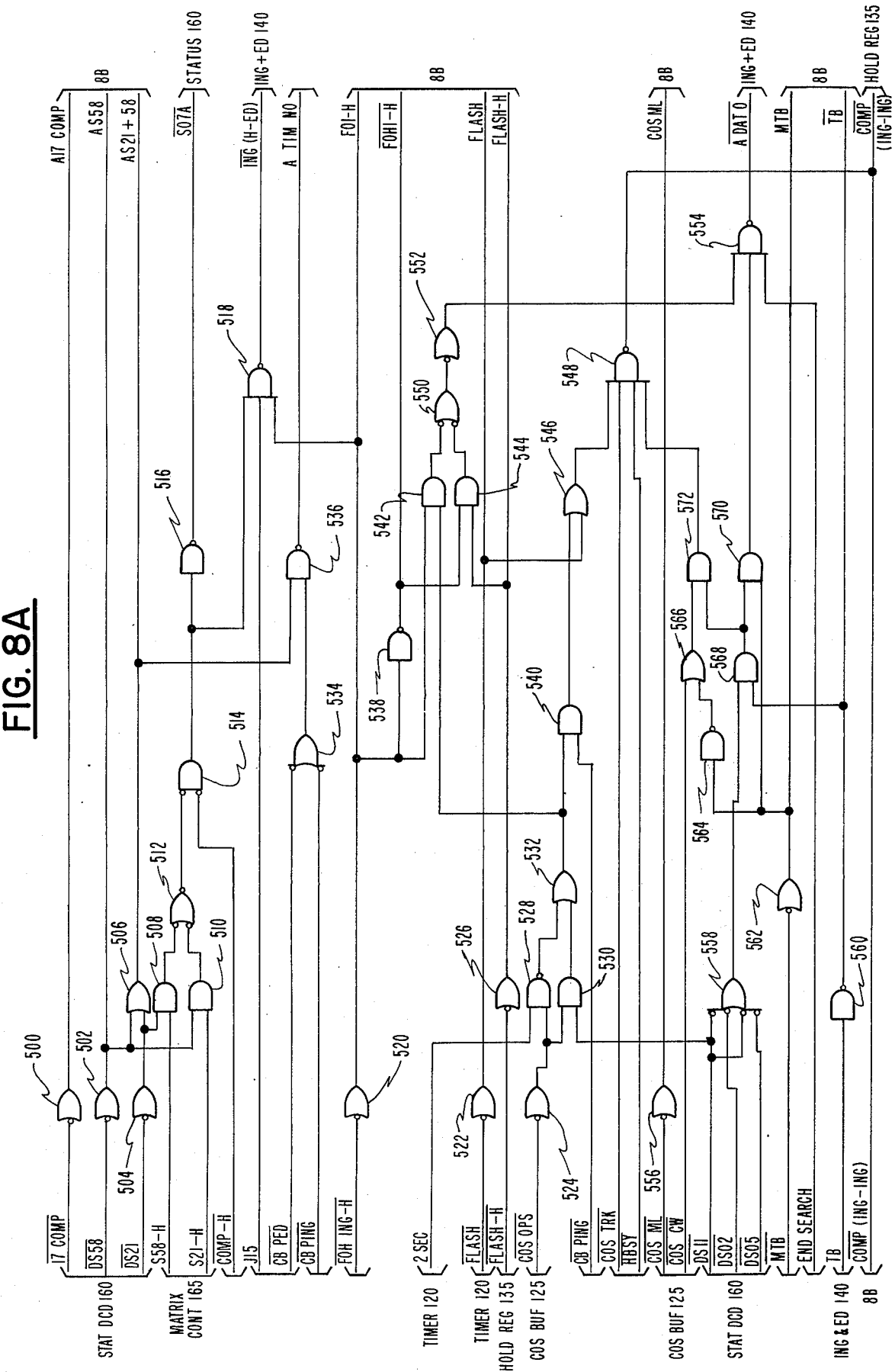
FIGS. 8A and 8B are detailed schematic circuit diagrams of the logical implementation for the operational decisions illustrated in FIGS. 7A–7C.
Figure 8B:
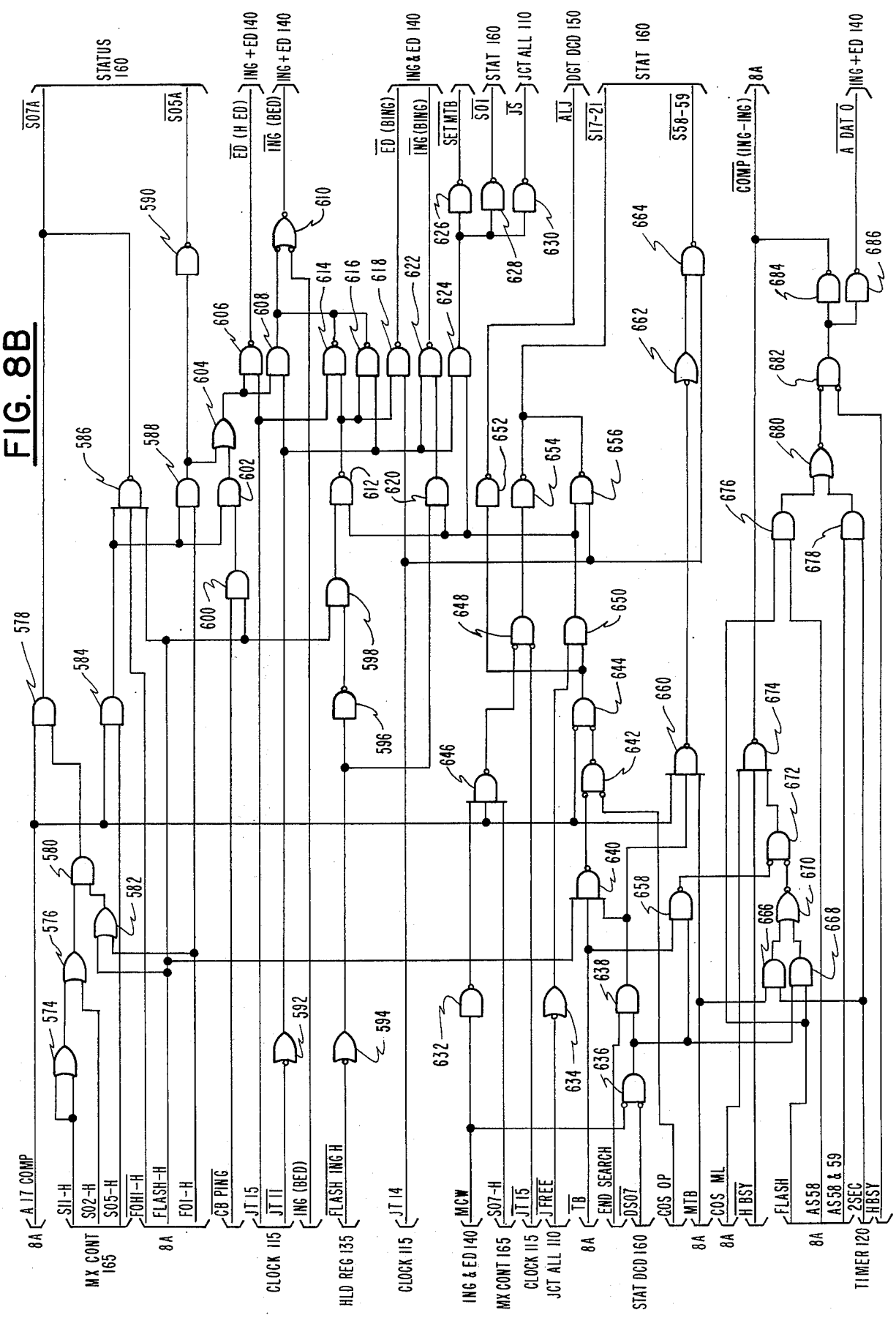

This functional sequence illustrated in FIG. 7A is implemented by the logic circuitry with the circuitry shown in FIG. 8B. An AND gate 636 is enabled by the combination of a signal that the system is in a status 7 (DS07, from the status decoder 160) and a signal from the ING and ED memory 140 that the call waiting bit, MCW, is not set. When the gate 636 is enabled, an indication that the comparison has ended, END SEARCH, from the hold register 135 enables an AND gate 638. The gate 638 enabled, together with an indication that the hold register search was begun by a hookflash (signal FLASH-H from the hold register 135) and an indication that the trunk transfer bit is not set (signal $\overline{TB}$) enables an AND gate 640.

If the AND gate 640 is enabled and the operator class-of-service signal COS OP is not present an AND gate 642 is enabled. When the gate 642 is enabled and a signal A17 COMP (indicating a comparison finding a status 17 in a junctor having the same ING number with the ING number searched for) is not present, an AND gate 644 is enabled. When the gate 644 is enabled the system is at decision 26 (FIG. 7A) where a junctor is allotted for the local transfer function. The second local junctor LC2 is allotted by a signal ALJ transmitted from the gate 644 via a gate 652 to the digit decoder and therefrom to the common control and junctor allotter. When the common control 110 has found a free local junctor LC2, it transmits a signal JFREE (via a gate 634) which enables a gate 650 when combined with the output signal from the gate 644. The output signal from the gate 650 is an enabling signal for AND gates 612, 620, 624 and 656 and corresponds to decision D27 in FIG. 7A. The output signal from the gate 650 is transmitted via a gate 624 and thereupon via gates 626 and 628 and 630 as the signals SET MTB, SO1, and JS respectively, during junctor time slot 11. The JS signal transmitted to the junctor allotter in the control circuit 110 selects (random access) the local junctor that was found free and permits the status signal SO1 to be stored therein during the same time slot, JT11 (which enables gate 624). At the same time the local transfer bit is set by the signal SET MTB. These commands correspond to decision D33 shown in FIG. 7A.

When the local junctor LC2 is selected by the JS signal during junctor time slot 11, the output signal from the gate 650 also enables the gate 620 to decode the presence of the signal FLASH ING H (which indicates that a flash from the calling station began the hold register search) from the hold register 135. The output signal from the gate 620 permits an AND gate 622 to be enabled during junctor time slot 11 and to have an output signal which commands the ING and ED memory 140 to store the information in the ING portion of the buffer into the ING portion of the junctor memory associated with the second local junctor LC2. This occurs as decision D32 in FIG. 7A.

If the calling station did not make the flash which began the hold register search and the called station did (indicated by signal FLASH-H to an AND gate 598 from the hold register) the gate 598 is enabled and the output signal from the gate 650 enables an AND gate 612. The output signal from the gate 612 permits three AND gates 614, 616 and 618 to be enabled. During junctor time slot 11, the gate 616 is enabled and transmits the signal ING (BED) via a gate 610 to store the information in the ED portion of the buffer into the ING portion of the ING and ED memory associated with the second local junctor LC2. This completes the decision D31 shown in FIG. 7A and the random accessing of the second local junctor LC2. The junctor time slots now progress, the JS signal goes low, and the first local junctor LC1 is again addressed. The output signal from the gate 650 enables an AND gate 656 during junctor time slot 14 and the gate 656 transmits a signal S17-21 (store a status 17 signal) to the status circuit 160 which corresponds to the decision D34, in FIG. 7A. The gates 614 and 618 still each have one input enabled by the output signal from the gate 612. During junctor time slot 14 the gate 618 generates the signal ED (BING) — store the information in the ING portion of the buffer into the ED portion of the first junctor LC1 memory. During junctor time slot 15 the gate 614 generates the signal ING (BED)—store the information in the ED portion of the buffer into the ING portion of the memory corresponding to the first junctor LC1, via gate 610.

The foregoing completes the decisional instruction D30 shown in FIG. 7A. The first local junctor now has the transferring number stored in the calling portion of its associated memory and the transferred number stored in the called portion of its associated memory and is in a local hold status 17, while the second local junctor has the transferring number stored in the calling portion of its memory and is in an initial off-hook status 1 and ready to signal the transferee party of the impending local transfer connection.

Referring again to FIG. 7A, the system may also progress from a local call in progress status 7 to the local transfer status 58 and the local three-way conference status 21. These status progressions are illustrated in the flow chart in FIG. 6 as progressions from block B7 to block B9 and B10. The initial process is the same as described above for the beginning of the local transfer function. The sequence from decision D1 through decision D13 in FIG. 7A has been described above. At decision D13 a comparison has found the second local junctor with a 17 stored in the status portion of its associated memory and the answer is yes. The system, next, begins two parallel sequences to reach the blocks B9 and B10. One path interrogates whether a status 7 began the hold register search. If the answer to the decisional question in block D15 is affirmative, then the first local junctor LC1 which was found with a local hold status 17 therein has a status 21 stored in its associated memory as is shown functionally in block D16.

The system then checks for the presence of the local transfer bit MTB (block D14). If the bit is located, the arrangement waits until the search is ended (block D17) which indicates the system has returned to the second local junctor which began the search. Subsequently, if the junctor is in a status 7 (which means the three-way conference should be set up) in block D18, the status 58 is stored in the second local junctor LC2 shown functionally in block D19.

These decisions complete the progression from the local call in progress set up in the second local junctor to a full three-way conference with the local transfer function using two junctors. In the first local junctor the status is a local three-way conference status 21 and the transferring party is connected to the transferred party by means of their two common crosspoints. The second local junctor LC2 connects the transferring party to the transferee party by their two common crosspoints. In both junctors, the transferring party is recognized as the calling party and the second party is recognized as the called party. The transferee and transferred stations are connected by the two common crosspoints of the transferring station.

The logical implementation of this decisional chart illustrated in FIG. 7A will now be more fully explained by reference to the logic diagrams beginning with that shown in FIG. 8B.

The circuitry which implements decisional blocks D1, D2 and D3, illustrated in FIG. 7A, perform additional functions for other operational flows in the system and are part of the common circuitry of the control 110.

If the call waiting bit, MCW, is not received from the ING and ED memory and a hookflash signal, FLASH, is received from the timer 120 an AND gate 668 (FIG. 8A) is enabled (assuming the gate 636 is enabled by the status signal DS07 from the status decoder). An AND gate 666 is enabled by the coincidence of the local transfer bit, signal MTB, and the signal 2 SEC from the timer. The output signal from either of the gates 666 or 668 is transmitted via an OR gate 672 to one input of an AND gate 672. The output signal from the gate 670, together with the output signal from the gate 658 (which provides the indication that the trunk transfer bit has not been set) enables an AND gate 672 (Resulting in decision D8 in FIG. 7A). If the line flashing (transferring) has the class-of-service for local transfer (indicated by the signal COS ML) and the hold register is not busy (signal H BS4) an AND gate 674 is enabled and transmits the command to compare the ING number of the junctor memory with all ING numbers, COMP (ING-ING), corresponding to the decision D11 in FIG. 7A.

The system now searches for a local junctor which has the calling number stored in its associated memory, i.e., the junctor which was placed on local hold status 17 when the system began the local transfer function. When that local junctor, which is LC1, is located, an A17 COMP signal, together with an SO7-H signal are transmitted to an AND gate 646. Since the call waiting bit signal, MCW, transmitted via the gate 632 is not set, the gate 646 is enabled and transmits an output signal which enables an AND gate 648 during junctor time slot 15. The foregoing sequence corresponds to the decision D15 in FIG. 7A which indicates that a hold register search was initiated in a status 7 and the junctor which contained the local hold status 17 has been found. The status of the junctor now is changed to a local three-way conference status 21. During junctor time slot 15, gates 648 and 654 are enabled and transmit the status signal S17-21 to the status circuit 160. This command corresponds to the decisional block D16 in FIG. 7A. The hold register steps through the remains of the junctors until it returns to the junctor which began the search, LC2, an END SEARCH signal transmitted via the gate 638 enables the gate 660 (since the A17 COMP, MTB, and DS07 signals are present and the call waiting bit is absent). The system is now in the decisional block B19 (in FIG. 7A) which indicates a status 58 or a local transfer status should be stored in the portion of junctor memory associated with the local junctor LC2. This command, signal S58-59, is transmitted to the status circuit 160 when an AND gate 664 is enabled during junctor time slot 14. The preceding completes the progression of the system from the functional status 7 into the local transfer status 58 in local junctor LC2 and the local three-way conference status 21 in LC1.

The functional description of the system proceeding from the status of dialing 2 or 3, the ringing status 5, the call waiting status 10, or the busy tone status 11 back to the local call in progress status 7 (block B1 in FIG. 6) or to status 5 (block B8) will now be more fully explained with reference to FIG. 7B.

If any of the statuses SO2, SO5, S11 or S10 is present (for example, in blocks D35, D35A, D35B or D35C, respectively) the timer is started (block D36) to time either a hookflash or an onhook signal. The system then checks (block D37) to ensure that the line presenting the signal does not have a trunk class-of-service and does not have a trunk transfer bit set (block D38).

The system next checks whether the local transfer bit is set and the class-of-service call waiting is available (block D39). A check is made whether the signal that initiated the sequence was a hookflash (block D40) or a two second on-hook signal (block D41). If either is detected, the system continues to proceed toward the original local call progress in (block B1 in FIG. 6). The arrangement (block D42) next checks whether the line going onhook has an operator class-of-service. If not, the CB relay for the calling number is checked to see if it is set and, since the two second answer signal has been given (in block D41), the answer should be negative. The decision D41 blocks the rest of the path if the transferring station is off-hook. If the line does have an operator class-of-service, indicating that the line can be used as an attendant, the status 11 signal is checked (block D43) and if it is not present, the arrangement proceeds to block D44. However, if a status 11 signal is present, the path for local transfer is blocked, and other circuits in the system take the call to a universal night answer feature.

The system checks whether the CB relay of the transferring station is set and, if not, the hold register is again seized (if it is found not busy — block D45) for a comparison of the ING number in the portion of the memory associated with junctor LC2 with all ING numbers in the rest of the memory (block D46). If a status 10 signal initiated the timer, the local junctor LC2 is released immediately by a free status 0 (blocks D45A and D45B).

The command, COMP (ING-ING), starts a search for the local junctor LC1 which has the local hold status 17 stored therein and, when the local junctor is found, the comparison signal check for 17 COMP (block D57) is affirmative. The 17 COMP signal is used to inform the arrangement that the first local junctor LC1 has been located. The system then checks whether the hold register search was initiated by a hookflash (indicating a return to the local call) or by a final onhook signal from the transferring station (block D56). The system then checks whether the hold register search was begun from either a status 2 or a status 11 (block D58) and if so, transmits a command (block D66) to store the local call in progress status 7, thereby returning the calling party (transferring station) to the original junctor LC1.

On the other hand, if the hold register search was initiated by a status 5 signal (block D59) the arrangement follows a different sequence. The system again interrogates whether a final on-hook signal from the calling party started the hold register search. If so, then the status 5 signal is affirmative (from block D59) and a status 5 is stored in the first local junctor LC1 (in block D65). At the same time the calling and called party numbers are switched in the memory (block D64) since the number in the hold register ED portion corresponds to the transferee party and the number in the ED portion of the buffer corresponds to the transferred party. The signal generated indicates the transferring party has gone on-hook and the transferred party then becomes the ING party in the portion of the memory associated with the local junctor LC1 and the transferee party becomes the called party.

If however, the signal from the status 5 ringing function was a hookflash instead of a final on-hook, the answer check in block D61 is affirmative and the system again proceeds to a status 7 (block D66).

The hold register search is completed when the system reaches the decision D47 indicating a return to addressing local junctor LC2. The system checks whether the local transfer bit is present (block D48) and, if so, a check is made for a trunk transfer bit (block D49). If the local transfer bit is present and the trunk transfer bit is not present, the system checks whether the status of the local junctor LC2 which began the search was a 2, 5, or 11 (block D50). In the case where the answer is yes, a check is made (block D51) whether the hold register search was initiated by either a final on-hook signal from the calling party or a hookflash signal (block D52).

If either signal initiated the search, the local junctor LC2 is now released (block D55) and, as described above, the local junctor LC1 has returned to the original local call in progress status 7. The blocks D53 and D54 relate to the universal night answering feature (as did blocks D42 and D43). Thus, it is seen that beginning with all four statuses S02, S05, S10 and S11 the system progresses through the sequences D36-D45 to locate the local junctor LC1 which is in hold condition. The search path is initiated either by a hookflash or by an on-hook signal at the transferring station from the local junctor LC2 as explained above. The flow path D57, D59, D60, D65 provides the decisions necessary to determine the progression of status between ringing status 5 (block B6 in FIG. 6) to ringing status 5 (block B8) while the flow path D57, D56, D58, D61, D66 provides logical decisions for proceeding to local call in progress status 7 (block B1). The flow path D47-D55 then provides for the release of the local junctor LC2 (except during call waiting status 10 when local junctor LC2 is released directly by decisions D45A, D45B).

Figure 7B:
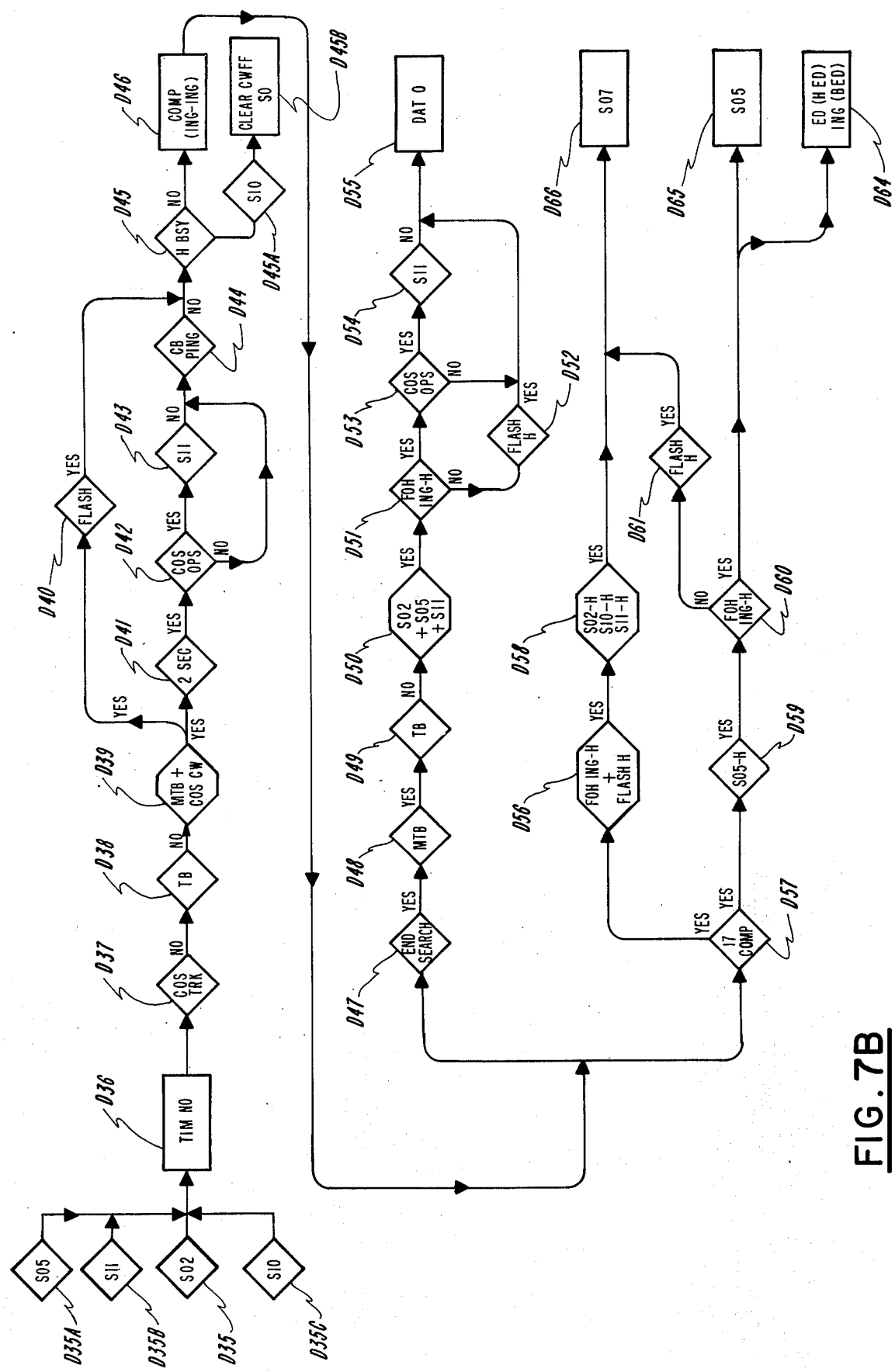

The logical implementation of the decisional flow chart illustrated in FIG. 7B is illustrated beginning with the logic circuitry shown in FIG. 8A. The status signals DS11, DS2, DS10 and DS5 from the status decoder 160 are transmitted to an OR gate 558 which is enabled each time that at least one of these statuses is present in the system. The output signal from the gate 558 is combined with the signal TB (indicating the absence of a transfer bit in the ING and ED memory 140) by an AND gate 568. The output signal from the gate 568 is transmitted to one input of an AND gate 572 which is enabled when an OR gate 556 is enabled. The gate 556 is enabled either by a signal COS CW from the class-of-service buffer 125 (indicating that the call waiting class-of-service is available) or by a signal MTB (indicating that the local transfer bit is present) transmitted via a gate 564. Thus, the output of gate 572 then corresponds to the decision D39 in FIG. 7B.

The output signal from the gate 572 provides one input to an AND gate 548 (which decodes the decision D45). The gate 548 is enabled if the hold register is not busy (signal HBSY from the hold register 135), the class-of-service trunk signal COS TRK is transmitted from the class-of-service buffer 125 (decision D37 of FIG. 7B), the signal FLASH is transmitted to the gate 548 via gates 522 and 546, the 2 SEC signal is transmitted to gate 548 via gates 528, 532, 540 and 546 and the signal COS OPS is transmitted from the class-of-service buffer via a gate 524 (if line does not have operator class-of-service). The signal COS OPS also enables an AND gate 530 when the status 11 signal is present to provide an output indicating the results of decisions D42 and D43 in FIG. 7B.

When the transferring party has returned on-hook (rather than hookflashing) a gate 532 decodes the outputs of either of gates 528 or 530 to produce an input signal to the AND gate 540 which is enabled by the signal CB PING from the digit decoder indicating that the calling bridge relay is on-hook and the system has reached decision D44. When these input signals are transmitted to the gate 548, the signal COMP (ING-ING) is transmitted to the hold register to begin the comparison search for the local junctor LC1 which is in the local hold status 17. This is the decisional block D46 of FIG. 7B.

The system will now search for the local junctor LC1 having the local hold status 17 contained within the status memory and transmits a 17 COMP comparison signal from the hold register which is inverted to A17 COMP which enables an AND gate 578 (FIG. 8B) if an AND gate 580 is enabled. The gate 580 decodes the presence of a signal SO2-H (indicating status 2 initiated the hold register search) of a signal S11-H (indicating that the status 11 signal began the hold register search) together with a signal FOH ING-H (indicating the final on-hook signal of the calling party began the hold register) or a signal FLASH-H (indicating that the flash signal began the hold register search). Thus, the output of the gate 580 is the result of decisions D56 and D58 in FIG. 7B.

The ouput signal from the gate 580 enables an AND gate 587 to transmit to the status circuit 160 the status signal SO7A which stores status 7 in the local register LC1 that was found. This is the decision D66 in FIG. 7B. Simultaneously, with the transmittal of the A17 COMP signal, a status 5 signal beginning the hold register search (SO5-H) enables an AND gate 584 to which transmits an enabling signal to AND gates 586 and 588. The gate 586 is enabled if the flash signal has begun the hold register search (FLASH-H) and there was not a final on-hook signal from the calling party (FOHI-H). This is logical decision 61 in FIG. 7B and again produces the storage of status 7 (block D66 in FIG. 7B) by transmitting a storage signal SO7A to the status circuit 160. If, however, during the status 5 hold signal, a final on-hook signal (FOI-H) from the calling party is present a gate 588 is enabled and transmits via a gate 590 a storage signal, a status 5 signal SO5A. The storage of the status 5 signal is the completion of the transfer function to the local junctor LC1 and corresponds to the decisional block D65 in FIG. 7B.

The output signal, transmitted via gates 608 and 610, from the gate 588 also enables the storage of the identity contained in the ED portion of the buffer and the ING portion of the junctor memory during junctor time slot 11 and, transmitted via a gate 606 enables the storing of the called portion of the hold register into the ED portion of the junctor memory by a signal ED (H ED) during junctor time slot 15. After the hold register search has been completed, a signal END SEARCH transmitted from the hold register 135 enables a gate 554 (in FIG. 8A) to initiate a clearing signal A DAT O to the local junctor LC2. This permits the release of the local junctor LC2 and corresponds to decision D55 in FIG. 7B. Accordingly, a gate 570 and a gate 552 decode necessary logical conditions to provide additional inputs to gate 544 required for transmittal of the clearing signal A DAT O. One input to the gate 570 decodes the presence of either status 2, 11 or 5 via gates 558 and 568 and the absence of the trunk transfer bit (signal TB) via gates 560 and 568. The other input to the gate 570 decodes the presence of the local transfer bit signal MTB via gate 562. The output of the gate 570 provides the logical combination of decisions D48, D49, D50 in FIG. 7B.

The gate 552 which is enabled by output signals from either an AND gate 542 or an AND gate 544 via a gate 550 provides a signal to gate 554 corresponding to decisions D51-54 in FIG. 7B. The gate 544 is enabled by the presence of signal, FLASH-H (transmitted via a gate 526) indicating the hold register search was initiated by a flash and a signal, FOH-ING-H transmitted via gates 520 and 538), indicating the absence of the final on-hook of the calling party. The gate 542 is enabled by the coincidence of the presence of the FOH-ING-H signal (transmitted via a gate 520) and a high output from an AND gate 530 (transmitted via a gate 532). The gate 530 is enabled by a combination of the absence of the status 11 signal DS11 and the presence of the COS OPS signal from class-of-service buffer 125. This process completes the decisional diagram shown in FIG. 7B and the progression of the system from status 2, 5, 10 or 11 to the status 7 or status 5 indication shown in that Figure.

Figure 7C:
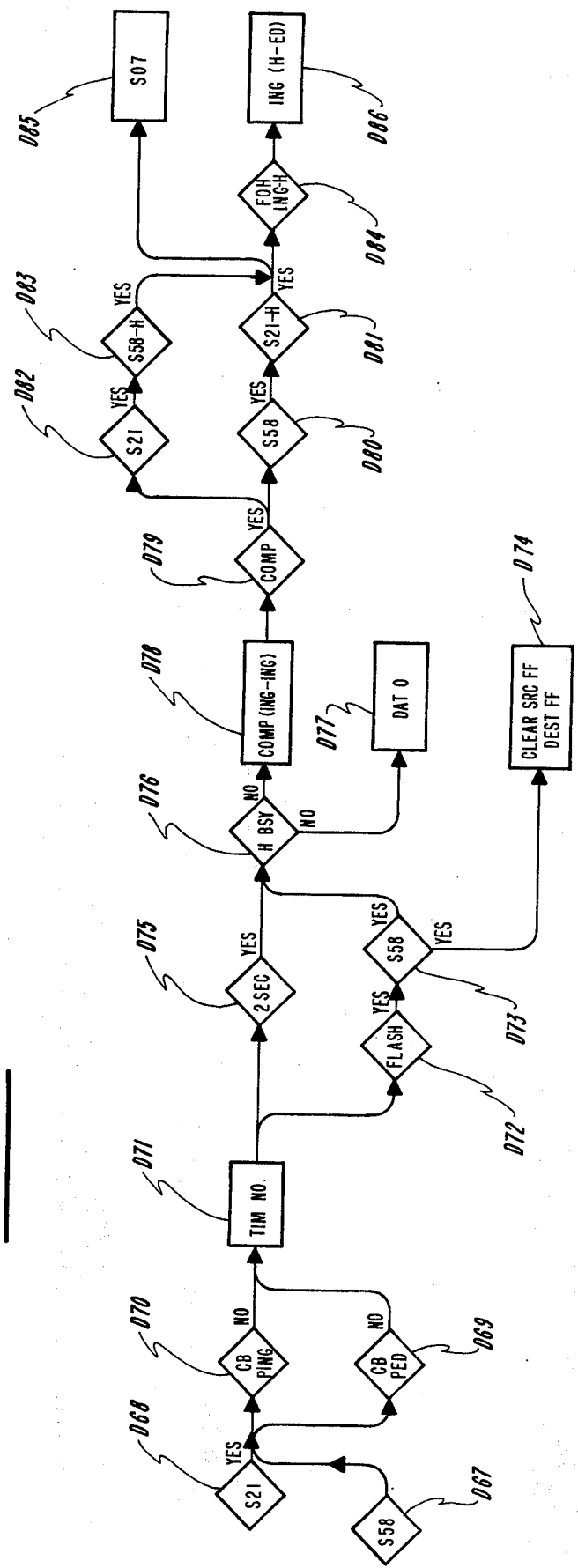

The progression of the system from the local transfer status 58 and the local three-way conference status 21 to the local call in progress status 7 or the junctor release status 15 will now be more fully explained by reference to the functional diagram in FIG. 7C.

When the system is in the local transfer status 58 the local junctor LC2 has the number of the transferring party stored in the calling portion of the junctor memory and the number of the transferee party stored in the called portion of the junctor memory, while the first local junctor LC1 is in the local three-way conference status 21 and has the number of the transferring party stored in the calling portion of the memory and the number of the transferred party stored in the called portion of the memory associated therewith. This is the local three-way conference and was obtained by a hookflash of the transferring party from the second local junctor.

As described before, however, the status may also have been developed by the transferring party returning on-hook in which case the system momentarily passes through these two states as will be more fully described below.

When the system is in status 21 or status 58 (blocks D68 and D67, respectively, in FIG. 7C) the system checks for the condition of the CB relay for either the calling or called station of the junctor it is presently addressing.

If either one of these is on-hook, the timer D71 is started by the command-time the number (TIM NO.). When the timer initially determines there was an on-hook signal (block D75) by timing the duration of the CB relay on-hook status for 2 SEC or that there was a hookflash signal (block D72), a hold register search will be initiated (block D76) by interrogating whether the hold register is busy.

During status 58 (block D73), the SRC flip-flop and the DEST flip-flop are cleared before the hold register search is begun. At this time, the local junctor is cleared for release by a data 0 signal (block D77). The comparison is made between the ING number of the addressed junctor and all ING numbers of the other junctors (block D78) thereby searching for the other junctor used in the conference status. When a comparison is found (block D79) the system checks if the junctor found is a correct junctor by asking whether the status of that junctor is a status 21 (block D82) and if the hold register search was initiated with a status 58 (block D83). The system also checks alternatively, whether the present junctor status is 58 (block D80) and if the hold register search was begun with a status 21 signal (block D81). If either of these checks are affirmatively answered, the system stores the status 7 signal in the junctor addressed and if the final on-hook signal (block D84) is set transfers the ED number stored in the hold register into the ING portion of the memory associated with that junctor.

There are four conditions that these decision sequences cover: The transferring party returning on-hook, the transferee party returning on-hook, the transferred party returning on-hook, and a hookflash by the transferring party. The decisional flow for any of these conditions initiates a hold register search (block D76) for the companion junctor of the conference connection and the junctor presently addressed is released (block D77). When the second companion junctor is found, its status becomes a local call in progress status 7 with the two remaining parties connected (block D85). If the transferring party has gone on-hook, the other party connected in the junctor presently addressed must be forwarded to the companion junctor (blocks D84 and D86). Decisions D72 and D73 allow the system to release the local junctor LC2 (transferee party) by a hookflash (by either the transferring or transferred station) and then progress to status 7 in the local junctor LC1.

The decisional flow diagram of FIG. 7C will now be more fully described by reference to the logic circuitry in FIG. 8A.

With reference now to FIG. 8B, an AND gate 676 is arranged to be enabled by the status signal AS58 (transmitted from FIG. 8A) and the signal FLASH, an AND gate 678 is arranged to be enabled by the status signal AS58 + 21 and the signal 2 SEC from the timer 120. An OR gate 680 is enabled by an output signal from either of the gates 676 and 678. An AND gate 682 is enabled by the output signal from the gate 680 and the signal that the hold register is not busy, HBSY. The output signal from the gate 682 then provides the two commands to compare the ING number in the local trunk junctor presently addressed with all ING numbers in the junctor memory, COMP (ING-ING), via gate 684 and the A DAT O signal to the ING and ED memory 140 via gate 686. These two signals then correspond to the decisional blocks D78 and D77 respectively in FIG. 7C.

Returning now to FIG. 8A, an AND gate 510 combines the S21H signal with the status signal DS58 and an AND gate 508 combines the S58-H signal with the status signal DS21. When either of gates 508 or 510 is enabled, an output signal is transmitted via a gate 512 to one input of an AND gate 514. The gate 514 is enabled by the comparison signal, COMP H, indicating a comparison has been made. The output of the gate 514 corresponds to the decisional blocks D79 through D83 in FIG. 7C.

The output signal from the gate 514 commands the status circuit to store the status signal SO7A into the memory (via a gate 516) and to store the ED portion of the hold register into the ING portion of the memory via signal ING (H-ED) via enabled AND gate 518. The gate 518 is enabled during junctor time slot 15 by a final on-hook signal (via gate 520) from the calling number initiating the hold register search (FOH ING-H). This completes the status flow from the local transfer status 58 from the junctor LC2 and the local three-way conference status 21 from the local junctor LC1 to the local call in progress status 7 or the local release status 15.

While a preferred embodiment of the present invention has been described, it will be apparent to those skilled in the art that various changes and modifications may be made therein without departing from the spirit and scope of the appended claims.

What is claimed is:

1. In a private automatic branch exchange having a solid state switching matrix for connecting calling local stations to called local stations therethrough and including a common control for effecting said connections by a plurality of local junctors having a memory associated with said local junctors, a local transfer arrangement comprising:
    holding circuit means, responsive to a local transfer indication from a transferring station connected to a transferred station by a first local junctor, for placing the transferred station in a holding status;
    forwarding circuit means, responsive to said local transfer indication, for forwarding said transferring station to a second local junctor while said transferred station is in said holding status;
    signaling circuit means, directed by said transferring station while connected to said second local junctor, for signaling a transferee station of an impending local transfer; and
    connecting circuit means, responsive to receipt of an impending local transfer signal by said transferee station, for effecting a connection between said transferred station and said transferee station.

2. A local transfer arrangement as defined in claim 1 wherein said signaling circuit means includes means for connecting said transferring station to said transferee station by the second local junctor.

3. A local transfer arrangement as defined in claim 2 wherein said connecting circuit means includes means for effecting a three-way conference between said transferring station, said transferred station, and said transferee station.

4. A local transfer arrangement as defined in claim 3 wherein said signaling circuit means includes means, responsive to a first signal from said transferring station, for re-establishing the original local call.

5. A local transfer arrangement as defined in claim 4 wherein said signaling circuit means includes means, responsive to a second signal from said transferring station, for releasing said first and said second local junctors.

6. A private automatic branch exchange having a solid state switching matrix with line appearances on one co-ordinate side of the matrix and junctor appearances on the other co-ordinate side of the matrix wherein the connection of line appearances for local calls occurs by the closing of an associated crosspoint for each line appearance and for a local junctor, said exchange including a common control, time accessed by each junctor for effecting said connection by a progression of functional status indications wherein each junctor has a corresponding memory including storage for said status indications and the identities of the line appearances for the calling and called parties connected therethrough; said exchange being characterized by a local transfer circuit comprising:
    holding circuit means, responsive to a local transfer indication from a transferring station connected to a transferred station by one of said local junctors, for effecting the progression of the local junctor status from a local call in progress status to a local transfer holding status;
    forwarding circuit means, responsive to said local transfer indication, for forwarding said transferring station to a second local junctor while said first junctor is in said local transfer holding status;
    signaling circuit means, directed by said transferring station while connected to said second local junctor, for signaling a transferee station of an impending local transfer; and
    connecting circuit means, responsive to an answering signal received from said transferee station, for effecting a connection between said transferred station and said transferee station.

* * * * *